(12) United States Patent
Patel

(10) Patent No.: US 11,381,326 B1
(45) Date of Patent: Jul. 5, 2022

(54) DYNAMIC TRANSMISSION UNIT SIZE

(71) Applicant: Amazon Technologies, Inc., Seattle, WA (US)

(72) Inventor: Vinit Bharat Patel, Rancho Santa Margarita, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1 day.

(21) Appl. No.: 16/807,837

(22) Filed: Mar. 3, 2020

(51) Int. Cl.
*H04B 17/318* (2015.01)
*H04L 1/00* (2006.01)
*H04W 52/24* (2009.01)

(52) U.S. Cl.
CPC ......... *H04B 17/318* (2015.01); *H04L 1/0018* (2013.01); *H04L 1/0021* (2013.01); *H04W 52/245* (2013.01)

(58) Field of Classification Search
CPC ... H04B 17/318; H04L 1/0018; H04L 1/0021; H04W 52/245
USPC ...................................................... 455/226.2
See application file for complete search history.

(56) References Cited

U.S. PATENT DOCUMENTS

| | | | |
|---|---|---|---|
| 10,070,339 B2 * | 9/2018 | Chhabra | H04B 7/0413 |
| 2012/0295635 A1 * | 11/2012 | Yokota | H04W 64/006 |
| | | | 455/456.1 |
| 2015/0063189 A1 * | 3/2015 | Merlin | H04W 72/042 |
| | | | 370/312 |
| 2017/0064740 A1 * | 3/2017 | Zhou | H04W 74/0816 |
| 2019/0174543 A1 * | 6/2019 | Zhou | H04W 74/0816 |
| 2021/0160722 A1 * | 5/2021 | Rengaraju | H04W 24/10 |

* cited by examiner

*Primary Examiner* — Ankur Jain
(74) *Attorney, Agent, or Firm* — Lee & Hayes, P.C.

(57) ABSTRACT

Systems and methods for dynamic maximum transmission unit determination are disclosed. For example, one or more triggering events may be detected to initiate determining whether to adjust transmission unit sizing for data transmission between devices. Received signal strength indicator (RSSI) values may be exchanged between the devices and those RSSI values may be utilized to determine a strength of a communication signal between devices. When the RSSI values are low, the communication signal strength may be weak and the devices may adjust the transmission unit size to be larger. In other examples when the RSSI values are high, the communication signal strength may be strong and the devices may adjust the transmission unit size to be smaller.

20 Claims, 9 Drawing Sheets

DYNAMIC TRANSMISSION UNIT SIZE

BACKGROUND

Electronic devices can communicate with each other using one or more short-range communication protocols. Transmission of data packets between electronic devices may be based on hardware and/or software configurations of the electronic devices. Described herein are improvements in technology and solutions to technical problems that can be used to, among other things, increase performance of data packet transmission between electronic devices.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
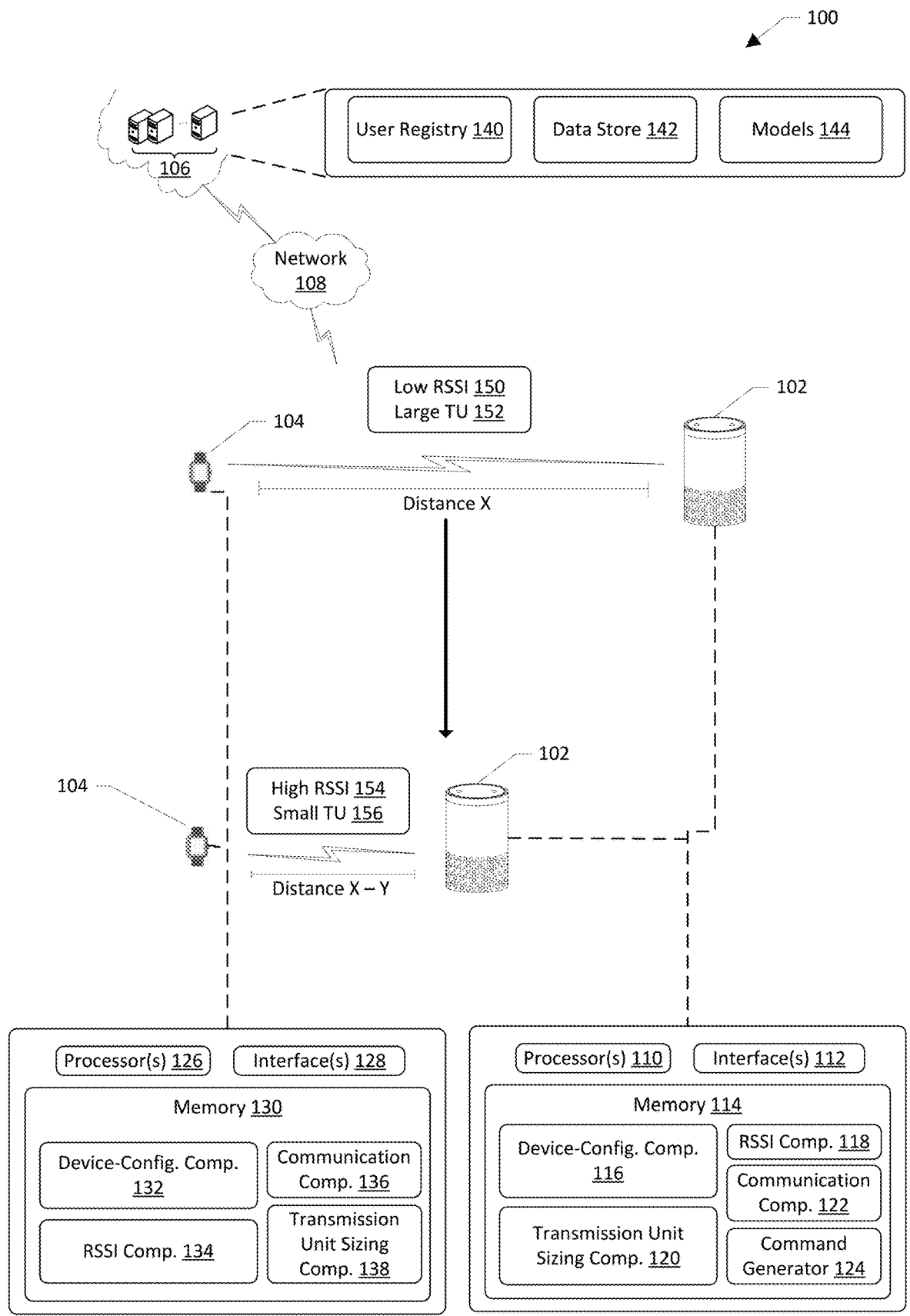
FIG. 1 illustrates a schematic diagram of an example environment for dynamic transmission unit sizing.

Systems and methods for dynamic transmission unit sizing are disclosed. Take, for example, an environment such as a home where one or more electronic devices may be disposed. For example, the electronic devices may include voice interface devices (e.g., Echo devices, mobile phones, tablets, personal computers, etc.), video interface devices (e.g., televisions, set top boxes, virtual/augmented reality headsets, etc.), touch interface devices (tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home associated with the first user profile, in a place a business, healthcare facility (e.g., hospital, doctor's office, pharmacy, etc.), in vehicle (e.g., airplane, truck, car, bus, etc.) in a public forum (e.g., shopping center, store, etc.), for example. The electronic devices may be configured to send data to and receive data from each other.

When data transmission occurs between devices, the data being transmitted may be transmitted as data packets having a given transmission unit size. In examples, when a sending device and a receiving device are paired or otherwise associated with each other, each of the devices shares information about the maximum transmission unit size that device is configured to handle at any given time. For example, the sending device may include robust computing resources and/or may have interfaces or hardware components that are superior to those of the receiving device. In these examples, the transmission unit size for data transmission associated with the receiving device may be less than the transmission unit size for data transmission associated with the sending device. In these examples, the sending device may receive data indicating the transmission unit size for the receiving device and may accept that transmission unit size for data transmission with the receiving device. Generally, once the transmission unit size is agreed upon between the sending device and the receiving device, the transmission unit size remains static.

Described herein are processes for dynamically changing the transmission unit size for data transmission between two or more devices. For example, when a received signal strength indicator (RSSI) value associated with communications between devices is high, the devices may be able to utilize a smaller transmission unit size for data transmission. Utilizing a smaller transmission unit size may reduce latency of the data transmission between devices and may be preferable to utilizing the default transmission unit size that was initially agreed upon between the devices. In other examples when the RSSI value is low, the devices may be able to utilize a larger transmission unit size for data transmission. Utilizing a larger transmission unit size may increase throughput of data between the devices and require fewer acknowledgement processes by devices during data transmission. It should be understood that when describing RSSI values as "high" or "low," those descriptions are provided by way of example and generally denote one or more RSSI values that indicate the strength of a communication signal between devices. As noted in several examples provided herein, given RSSI values are noted as examples of "high" RSSI values and/or "low" RSSI values.

To determine when and how to adjust transmission unit size as described herein, one or more triggering events may occur that may cause the receiving device and/or the sending device to determine whether the transmission unit size is to be changed. For example, a communication component of the sending device may receive data representing content to be transmitted between the devices. The sending device may determine a data type associated with the content. In examples where the data type corresponds to a predefined data type, initiation of determining whether to adjust the transmission unit size may occur. For example, when the content corresponds to image data or otherwise to data that has been designated as a predefined data type for transmission unit size adjustment, an RSSI component may receive data representing RSSI values from the receiving device and/or may utilize the data representing the RSSI values that has already been received from the receiving device. In other examples, the triggering event may occur when the content is associated with at least a predefined file size indicating that the content is a large file.

In still other examples, the sending device may receive RSSI values from the receiving device over time. When the RSSI values satisfy a given threshold value for a threshold period of time, the transmission unit size adjustment processes described herein may be initiated. For example, RSSI values may be exchanged between the receiving device and the sending device continuously and/or periodically, even when content is not transmitted between devices. Thresholds for high RSSI values and/or low RSSI values may be determined, and when the RSSI values exchanged between the devices satisfy one or more of those thresholds for a given period of time, transmission unit size adjustment processes may be initiated. For example, a receiving device may be mobile and may move frequently to be nearer or farther from the sending device over time. When the receiving device is near the sending device, the RSSI value may be high. When the receiving device is far from the sending device, the RSSI value may be low. In other examples, characteristics such as objects impeding communication between devices may be present and/or a state of one or more of the devices, such as based on battery life, may affect the RSSI values over time. In these examples, when the RSSI value changes more than a threshold amount (e.g., due to moving objects intermittently impeding communications between the devices), the transmission unit size adjustment processes described herein may be initiated. Additionally, or alternatively, historical RSSI values associated with the receiving device and/or the sending device may be utilized to determine when to initiate transmission unit size adjustment processes. For example, the historical RSSI values may indicate a time of day, a day of the week, and/or a period of time when RSSI values are predicted to satisfy threshold RSSI values for transmission unit size adjustment. The RSSI values received during such periods of time may be utilized to determine whether to adjust the transmission unit size. It should be understood that the triggering events described herein are provided by way of example, and this disclosure includes any event that may inform the decision to initiate transmission unit size adjustment. In examples, a command generator of the sending device may generate and send commands to the receiving device instructing the receiving device to provide RSSI values, such as based at least in part on determining that one or more of the triggering events has occurred.

An RSSI component may be configured to receive RSSI values and determine whether the RSSI values indicate that transmission unit size should be adjusted. For example, a given RSSI value may correspond to a given transmission unit size, such as an RSSI value of −30 decibels corresponding to an transmission unit size of 1,000, and/or an RSSI value of −35 decibels corresponding to an transmission unit size of 973, etc. In other examples, the RSSI component may determine whether the RSSI value satisfies one or more RSSI value thresholds and may determine the transmission unit size based at least in part on the transmission unit size associated with the one or more RSSI value thresholds. For example, an RSSI value of −30 may satisfy a threshold of −35 but not a threshold of −25, and an transmission unit size corresponding to an RSSI value between those two thresholds may be utilized. It should be understood that additional or alternative data other than RSSI values may be utilized to determine communication abilities between devices. Such other data may include data indicating a state of one or more of the devices, a battery level of one or more of the devices, a communication mode of the one or more devices, etc.

An transmission unit sizing component may receive data from the RSSI component indicating the transmission unit size to be utilized for data transmission with the receiving device, and/or the transmission unit sizing component may receive the RSSI values from the RSSI component and may determine the transmission unit size associated with the RSSI value and/or range of RSSI values. The transmission unit sizing component may be configured to adjust the transmission unit size for data packets sent to and from the receiving device to the transmission unit size determined as described herein. The transmission unit size may remain the same until additional transmission unit sizing processes are performed, in examples.

The communication component of the sending device may receive content to be sent to the receiving device and may send data representing the content to the receiving device in data packets associated with the transmission unit size. The communication component may also receive data sent by the receiving device in the form of data packets associated with the transmission unit size. The command generator may be configured to generate and send commands to the receiving device instructing the receiving device to send data packets utilizing the transmission unit size as determined above. In examples, the communication protocol that may be utilized for data packet transmission may be a short-range communication protocol such as Bluetooth and/or Bluetooth Low Energy.

Additionally, or alternatively, the receiving device, the sending device, and/or a remote system associated with one or more of the devices may be configured to receive feedback data associated with data transmission utilizing the selected transmission unit sizes. This feedback data may be utilized to determine one or more performance metrics associated with sending and/or receiving data utilizing the transmission unit sizes. The performance metrics may include, for example, a latency associated with sending and/or receiving the data and/or a number of dropped packets associated with the data transmission. It should be understood that this disclosure includes any performance metrics associated with data transmission that may be impacted by the transmission unit size of transmitted packets. Based at least in part on the performance metrics, the transmission unit size may be adjusted to improve one or more of those metrics.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for dynamic transmission unit sizing. The system 100 may include, for example, sending devices 102 and receiving devices 104. The sending devices 102 and the receiving devices 104 may be electronic devices, which may include communal devices, personal devices, and/or devices configured with sensors to detect environmental changes. In certain examples, at least some of the devices 102, 104 may be voice-enabled devices (e.g., Echo-like devices, mobile phones, tablets, personal computers, etc.), video interface devices (e.g., televisions, set top boxes, virtual/augmented reality headsets, etc.), touch interface devices (e.g., tablets, phones, laptops, kiosks, billboard, etc.), and accessory devices (e.g., lights, plugs, locks, thermostats, appliances, televisions, clocks, smoke detectors, doorbells, cameras, motion/magnetic/other security-system sensors, etc.). These electronic devices may be situated in a home, a place a business, healthcare facility (e.g., hospital, doctor's office, pharmacy, etc.), in vehicle (e.g., airplane, truck, car, bus, etc.), and/or in a public forum (e.g., shopping center, store, etc.), for example. The devices 102, 104 may be personal devices, such as a mobile phone, tablet, laptop, wearable device, and/or other computing device that is specifically associated with a given user profile. The devices 102, 104 may be configured to send data to and/or receive data from a remote system 106, such as via a network 108. Additionally, it should be understood that a given space and/or environment may include numerous devices 102, 104. It should also be understood that when a "space" or "environment" is used herein, those terms mean an area and not necessarily a given room, building, or other structure, unless otherwise specifically described as such. It should also be understood that while several examples discuss sending data from the sending device 102 to the receiving device 104, each of the devices may be configured to send and/or receive data.

The sending devices 102 may include one or more components, such as, for example, one or more processors 110, one or more network interfaces 112, and/or memory 114. The sending devices 102 may also include microphones that may be configured to capture audio, such as user utterances, and generate corresponding audio data. The sending devices 102 may also include speakers that may be configured to output audio, such as audio corresponding to audio data received from another device and/or the system 106. It should be understood that while several examples used herein include a voice-enabled device that allows users to interact therewith via user utterances, one or more other devices, which may not include a voice interface, may be utilized instead of or in addition to voice-enabled devices. In these examples, the device may be configured to send and receive data over the network 108 and to communicate with other devices in the system 100. As such, in each instance where a voice-enabled device is utilized, a computing device that does not include a voice interface may also or alternatively be used. The memory 114 may include one or more components such as, for example, a device-configuration component 116, an RSSI component 118, and transmission unit sizing component 120, a communication component 122, and/or a command generator 124, which will be described in more detail below. It should be understood that when voice-enabled devices are described herein, those voice-enabled devices may include phones, computers, and/or other computing devices.

The receiving devices 104 may include the same or similar components as the sending devices 102, and/or the receiving devices 104 may include components that differ from the sending devices 102. For example, the receiving devices 104 may include components such as, for example, one or more processors 126, one or more network interfaces 128, and/or memory 130. The memory may include components such as, for example, a device-configuration component 132, an RSSI component 134, a communication component 136, and/or an transmission unit sizing component 138. Each of these components will be described below in more detail.

The remote system 106 may include components such as, for example, a user registry 140, a data store 142, and/or one or more models 144. The remote system 106 may include one or more other components that are not depicted in FIG. 1, such as a speech-processing system. It should be understood that while the speech-processing system and the other components may be described as as separate from each other in FIG. 1, some or all of the components may be a part of the same system. The speech-processing system may include an automatic speech recognition component (ASR), a natural language understanding component (NLU), and/or a text-to-speech component (TTS). Each of the components described herein with respect to the remote system 106 may be associated with their own systems, which collectively may be referred to herein as the remote system 106, and/or some or all of the components may be associated with a single system. Additionally, the remote system 106 may include one or more applications, which may be described as skills. "Skills," as described herein may be applications and/or may be a subset of an application. For example, a skill may receive data representing an intent. For example, an intent may be determined by the NLU component and/or as determined from user input via a computing device. Skills may be configured to utilize the intent to output data for input to the TTS component, a link or other resource locator for audio data, and/or a command to a device, such as the sending device 102.

In instances where a voice-enabled device is utilized, skills may extend the functionality of devices 102, 104 that can be controlled by users utilizing a voice-user interface. In some examples, skills may be a type of application that may be useable in association with accessory devices and may have been developed specifically to work in connection with given accessory devices. Additionally, skills may be a type of application that may be useable in association with the voice-enabled device and may have been developed specifically to provide given functionality to the voice-enabled device. In examples, a non-skill application may be an application that does not include the functionality of a skill. Speechlets, as described herein, may be a type of application that may be usable in association with voice-enabled devices and may have been developed specifically to work in connection with voice interfaces of voice-enabled devices. The application(s) may be configured to cause processor(s) to receive information associated with interactions with the voice-enabled device. The application(s) may also be utilized, in examples, to receive input, such as from a user of a personal device and/or the voice-enabled device, and send data and/or instructions associated with the input to one or more other devices.

The components of the remote system 106 are described in detail below. In examples, some or each of the components of the remote system 106 may include their own processor(s), network interface(s), and/or memory. As such, by way of example, the speech-processing system may include and/or be associated with processor(s), network interface(s), and/or memory. The other components of the remote system, such as the models, may include and/or be associated with different processor(s), network interface(s), and/or memory, or one or more of these components may utilize some or all of the same processor(s), network interface(s), and/or memory utilized by the speech-processing system. These components are described in detail below. Additionally, the operations and/or functionalities associated with and/or described with respect to the components of the remote system 106 may be performed utilizing cloud-based computing resources. For example, web-based systems such as Elastic Compute Cloud systems or similar systems may be utilized to generate and/or present a virtual computing environment for performance of some or all of the functionality described herein. Additionally, or alternatively, one or more systems that may be configured to perform operations without provisioning and/or managing servers, such as a Lambda system or similar system, may be utilized.

The user registry 140 may be configured to determine and/or generate associations between users, user accounts, and/or devices. For example, one or more associations between user accounts may be identified, determined, and/or generated by the user registry 140. The user registry 140 may additionally store information indicating one or more applications and/or resources accessible to and/or enabled for a given user account. Additionally, the user registry 140 may include information indicating device identifiers, such as naming identifiers, associated with a given user account, as well as device types associated with the device identifiers. The user registry 140 may also include information indicating user account identifiers, naming indicators of devices associated with user accounts, and/or associations between devices, such as the devices 102, 104. The user registry 140 may also include information associated with usage of the devices 102, 104. It should also be understood that a user account may be associated with one or more than one user profiles. It should also be understood that the term "user account" may be used to describe a set of data and/or functionalities associated with a given account identifier. For example, data identified, determined, and/or generated while using some or all of the system 100 may be stored or otherwise associated with an account identifier. Data associated with the user accounts may include, for example, account access information, historical usage data, device-association data, and/or preference data.

The data store 142 may be configured to store data indicating information associated with the use of one or more of the devices 102, 104. For example, RSSI values generated by the devices 102, 104 may be stored in association with the data store 142. Additionally, data indicating changes to transmission unit sizing for data transmission between various devices may be stored in association with the data store 142. Additional information that may be relevant to dynamically determining transmission unit sizing for data transmission may also be stored in association with the data store 142. Such information may include default transmission unit sizing, feedback data indicating increased and/or decreased latency of data transmission, increased and/or decreased data throughput, a number of data packet acknowledgements made by a given device 102, 104, commands generated and/or sent between devices 102, 104, etc.

The models 144 may be configured to utilize data from the user registry 140, the data store 142, and/or from the devices 102, 104, for example, to determine one or more factors associated with dynamic transmission unit sizing. These factors may include, for example, RSSI threshold values as described in more detail herein, transmission unit sizing determinations, etc. Model training and/or testing may be performed such that the models 144, which may include machine-learning models, may identify one or more data types that indicate and/or inform the factors described herein. In these example, the system 100 may receive data from one or more of the sources described above. That data may be received and formatted for input into the models 144. The models 144 may determine a similarity between the sample data and the data previously identified as being indicative of the outcome at issue, such as transmission unit sizing.

The models 144 described herein may utilize predictive analytics to predict one or more outcomes. Predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases and may be utilized to predict trends and behavior patterns. In examples, the event, otherwise described herein as an outcome, may be an event that will occur in the future, such as whether presence will be detected. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome. Then, data may be collected and/or accessed to be used for analysis.

Data analysis may include using one or more models 140, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models 144. Thereafter, predictive modelling may be performed to generate accurate predictive models for future events. Outcome prediction may be deterministic such that the outcome is determined to occur or not occur. Additionally, or alternatively, the outcome prediction may be probabilistic such that the outcome is determined to occur to a certain probability and/or confidence.

While not depicted in FIG. 1, the speech-processing system may be configured to receive audio data from the devices 102, 104 and/or other devices and perform speech-processing operations. For example, the ASR component may be configured to generate text data corresponding to the audio data, and the NLU component may be configured to generate intent data corresponding to the audio data. In examples, intent data may be generated that represents the audio data, such as without the generation and/or use of text data. The intent data may indicate a determined intent associated with the user utterance as well as a payload and/or value associated with the intent. For example, for a user utterance of "play Video A," the NLU component may identify a "play" intent and the payload may be "Video A." In this example where the intent data indicates an intent to output images corresponding to "Video A," the speech-processing system may call one or more speechlets to effectuate the intent. Speechlets, as described herein may otherwise be described as applications and may include functionality for utilizing intent data to generate directives and/or instructions. For example, a communications speechlet may be called when the intent indicates that an action is to be performed associated with establishing a communication channel with another device. The speechlet may be designated as being configured to handle the intent of establishing a communication channel, for example. The speechlet may receive the intent data and/or other data associated with the user utterance from the NLU component, such as by an orchestrator of the remote system 106, and may perform operations to instruct the device 102, 104 to perform an operation. For example, a shopping speechlet may retrieve a user profile associated with the request may cause the item to be purchased utilizing purchasing information associated with the user profile. The remote system 106 may generate audio data confirming that a communication channel has been established, such as by the TTS component. The audio data may be sent from the remote system 106 to the device 102, 104 for output of corresponding audio by the speakers of the device 102, 104.

The components of the sending device 102 and the receiving device 104 will now be described utilizing one or more examples. These examples are nonlimiting and are meant to aid in understanding of the innovations discussed herein.

For example, when data transmission occurs between devices 102, 104, the data being transmitted may be transmitted as data packets having a given transmission unit size. In examples, when a sending device 102 and a receiving device 104 are paired or otherwise associated with each other, each of the devices 102, 104 shares information about the transmission unit size for that device 102, 104. For example, the sending device 102 (i.e., the electronic device from which data is sent) may include robust computing resources and/or may have interfaces or hardware components that are superior to those of the receiving device 104 (i.e., the device from which data is received). In these examples, the transmission unit size for data transmission associated with the receiving device 104 may be less than the transmission unit size for data transmission associated with the sending device 102. The device-configuration component 116 of the sending device 102 may be configured to determine the transmission unit size for the sending device 102, while the device-configuration component 132 of the receiving device 104 may be configured to determine the transmission unit size for the receiving device 104. The device-configuration components 116, 132 of the sending device 102 and the receiving device 104 may communicate each transmission unit size to the other device and may identify a default transmission unit size that both devices 102, 104 accept for sending data packets. In these examples, the sending device 102 may receive data indicating the transmission unit size for the receiving device 104 and may accept that transmission unit size for data transmission with the receiving device 104. Generally, once the transmission unit size is agreed upon between the sending device 102 and the receiving device 104, the transmission unit size remains static.

One or more of the devices 102, 104 may then determine when and how to adjust the transmission unit size to optimize data transmission between the devices 102, 104. For example, when a RSSI value associated with communications between devices 102, 104 is a high RSSI value 154, the devices 102, 104 may be able to utilize a smaller transmission unit size 156 for data transmission. Utilizing a smaller transmission unit size 156 may reduce latency of the data transmission between devices 102, 104 and may be preferable to utilizing the default transmission unit size that was initially agreed upon between the devices 102, 104. In other examples when the RSSI value is a low RSSI value 150, the devices 102, 104 may be able to utilize a larger transmission unit size 152 for data transmission. Utilizing a larger transmission unit size 152 may increase throughput of data between the devices 102, 104 and require fewer acknowledgement processes by devices 102, 104 during data transmission.

To determine when and how to adjust transmission unit size as described herein, one or more triggering events may occur that may cause the receiving device 104 and/or the sending device 102 to determine whether the transmission unit size is to be changed. For example, the communication component 122 of the sending device 102 may receive data representing content to be transmitted between the devices 102, 104. The sending device 102 may determine a data type associated with the content. In examples where the data type corresponds to a predefined data type, initiation of determining whether to adjust the transmission unit size may occur. For example, when the content corresponds to image data or otherwise to data that has been designated as a predefined data type for transmission unit size adjustment, the RSSI component 118 may receive data representing RSSI values from the receiving device 104 and/or may utilize the data representing the RSSI values that has already been received from the receiving device 104. In other examples, the triggering event may occur when the content is associated with at least a predefined file size indicating that the content is a large file.

In still other examples, the sending device 102 may receive RSSI values from the receiving device 104 over time. When the RSSI values satisfy a given threshold value for a threshold period of time, the transmission unit size adjustment processes described herein may be initiated. For example, RSSI values may be exchanged between the receiving device 104 and the sending device 102 continuously and/or periodically, even when content is not transmitted between devices 102, 104. Thresholds for high RSSI values and/or low RSSI values may be determined, and when the RSSI values exchanged between the devices 102, 104 satisfy one or more of those thresholds for a given period of time, transmission unit size adjustment processes may be initiated. For example, a receiving device 104 may be mobile and may move frequently to be nearer or farther from the sending device 102 over time. When the receiving device 104 is near the sending device 102, the RSSI value may be high. When the receiving device 104 is far from the sending device 102, the RSSI value may be low. In other examples, characteristics such as objects impeding communication between devices 102, 104 may be present and/or a state of one or more of the devices 102, 104, such as based on battery life, may affect the RSSI values. In these examples, when the RSSI value changes more than a threshold amount, the transmission unit size adjustment processes described herein may be initiated. Additionally, or alternatively, historical RSSI values associated with the receiving device 104 and/or the sending device 102 may be utilized to determine when to initiate transmission unit size adjustment processes. For example, the historical RSSI values may indicate a time of day, a day of the week, and/or a period of time when RSSI values are predicted to satisfy threshold RSSI values for transmission unit size adjustment. The RSSI values received during such periods of time may be utilized to determine whether to adjust the transmission unit size. It should be understood that the triggering events described herein are provided by way of example, and this disclosure includes any event that may inform the decision to initiate transmission unit size adjustment. In examples, the command generator 124 of the sending device 102 may generate and send commands to the receiving device 104 instructing the receiving device 104 to provide RSSI values, such as based at least in part on determining that one or more of the triggering events has occurred.

The RSSI component 118 may be configured to receive RSSI values and determine whether the RSSI values indicate that transmission unit size should be adjusted. For example, a given RSSI value may correspond to a given transmission unit size, such as an RSSI value of −30 decibels corresponding to an transmission unit size of 1,000, and/or an RSSI value of −35 decibels corresponding to an transmission unit size of 973, etc. In other examples, the RSSI component 118 may determine whether the RSSI value satisfies one or more RSSI value thresholds and may determine the transmission unit size based at least in part on the transmission unit size associated with the one or more RSSI value thresholds. For example, an RSSI value of −30 may satisfy or otherwise be greater than a threshold of −35 but not a threshold of −25, and an transmission unit size corresponding to an RSSI value between those two thresholds may be utilized. It should be understood that additional or alternative data other than RSSI values may be utilized to determine communication abilities between devices 102, 104. Such other data may include data indicating a state of one or more of the devices 102, 104, a battery level of one or more of the devices 102, 104, a communication mode of the one or more devices 102, 104, etc.

The transmission unit sizing component 120 may receive data from the RSSI component 118 indicating the transmission unit size to be utilized for data transmission with the receiving device 104, and/or the transmission unit sizing component 120 may receive the RSSI values from the RSSI component 118 and may determine the transmission unit size associated with the RSSI value and/or range of RSSI values. The transmission unit sizing component 120 may be configured to adjust the transmission unit size for data packets sent to and from the receiving device 104 to the transmission unit size determined as described herein. The transmission unit size may remain the same until additional transmission unit sizing processes are performed, in examples.

The communication component 122 of the sending device 102 may receive content to be sent to the receiving device 104 and may send data representing the content to the receiving device 104 in data packets associated with the transmission unit size. The communication component 122 may also receive data sent by the receiving device 104 in the form of data packets associated with the transmission unit size. The command generator 124 may be configured to generate and send commands to the receiving device 104 instructing the receiving device 104 to send data packets utilizing the transmission unit size as determined above. In examples, the communication protocol that may be utilized for data packet transmission may be a short-range communication protocol such as Bluetooth and/or Bluetooth Low Energy.

Additionally, or alternatively, the receiving device 104, the sending device 102, and/or the remote system 106 may be configured to receive feedback data associated with data transmission utilizing the selected transmission unit sizes. This feedback data may be utilized to determine one or more performance metrics associated with sending and/or receiving data utilizing the transmission unit sizes. The performance metrics may include, for example, a latency associated with sending and/or receiving the data and/or a number of dropped packets associated with the data transmission. It should be understood that this disclosure includes any performance metrics associated with data transmission that may be impacted by the transmission unit size of transmitted packets. Based at least in part on the performance metrics, the transmission unit size may be adjusted to improve one or more of those metrics.

It should also be noted that in the examples provided above, the components of the sending device 102 are described as performing one or more of the operations described herein, such as receiving RSSI values, determining whether the RSSI values indicate that transmission unit sizing adjustments should occur, and adjusting transmission unit sizing. However, one or more of those processes may be performed by the receiving device 104, such as by the RSSI component 134, the transmission unit sizing component 138, and/or the communication component 136 of the receiving device 104.

It should be noted that while text data is described as a type of data utilized to communicate between various components of the remote system 106 and/or other systems and/or devices, the components of the remote system 106 may use any suitable format of data to communicate. For example, the data may be in a human-readable format, such as text data formatted as XML, SSML, and/or other markup language, or in a computer-readable format, such as binary, hexadecimal, etc., which may be converted to text data for display by one or more devices such as the devices 102, 104.

As shown in FIG. 1, several of the components of the remote system 106 and the associated functionality of those components as described herein may be performed by one or more of the devices 102, 104. Additionally, or alternatively, some or all of the components and/or functionalities associated with the devices 102, 104 may be performed by the remote system 106.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

As used herein, a processor, such as processor(s) 110, 126 and/or the processor(s) described with respect to the components of the remote system 106, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110, 126 and/or the processor(s) described with respect to the components of the remote system 106 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 and/or the processor(s) described with respect to the components of the remote system 106 may possess its own local memory, which also may store program components, program data, and/or one or more operating systems.

The memory 114, 130 and/or the memory described with respect to the components of the remote system 106 may include volatile and nonvolatile memory, removable and non-removable media implemented in any method or technology for storage of information, such as computer-readable instructions, data structures, program component, or other data. Such memory 114, 130 and/or the memory described with respect to the components of the remote system 106 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114, 130 and/or the memory described with respect to the components of the remote system 106 may be implemented as computer-readable storage media ("CRSM"), which may be any available physical media accessible by the processor(s) 110, 126 and/or the processor(s) described with respect to the remote system 106 to execute instructions stored on the memory 114, 130 and/or the memory described with respect to the components of the remote system 106. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114, 130 and/or the memory described with respect to the components of the remote system 106, discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon. com Inc. of Seattle, Wash., USA; the Windows operating system from Microsoft Corporation of Redmond, Wash., USA; LynxOS as promulgated by Lynx Software Technologies, Inc. of San Jose, Calif.; Operating System Embedded (Enea OSE) as promulgated by ENEA AB of Sweden; and so forth.

The network interface(s) 112, 128 and/or the network interface(s) described with respect to the components of the remote system 106 may enable messages between the components and/or devices shown in system 100 and/or with one or more other polling systems, as well as other networked devices. Such network interface(s) 112, 128 and/or the network interface(s) described with respect to the components of the remote system 106 may include one or more network interface controllers (NICs) or other types of transceiver devices to send and receive messages over the network 108.

For instance, each of the network interface(s) 112, 128 and/or the network interface(s) described with respect to the components of the remote system 106 may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) 112, 128 and/or the network interface(s) described with respect to the components of the remote system 106 may include a wide area network (WAN) component to enable message over a wide area network.

In some instances, the remote system 106 may be local to an environment associated the devices 102, 104. For instance, the remote system 106 may be located within one or more of the devices 102, 104. In some instances, some or all of the functionality of the remote system 106 may be performed by one or more of the devices 102, 104. Also, while various components of the remote system 106 have been labeled and named in this disclosure and each component has been described as being configured to cause the processor(s) to perform certain operations, it should be understood that the described operations may be performed by some or all of the components and/or other components not specifically illustrated.

Figure 2A:
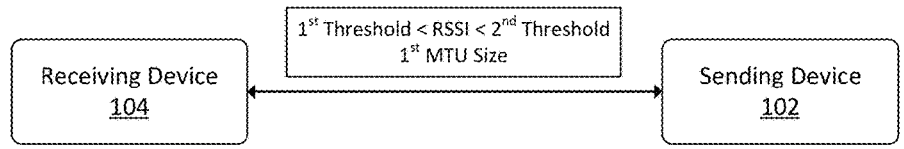
FIG. 2A illustrates an example of communication characteristics between a receiving device and a sending device.

FIG. 2A illustrates an example of communication characteristics between a receiving device 104 and a sending device 102. The receiving device 104 may include the same or similar components and may perform the same or similar operations as the receiving device 104 described with respect to FIG. 1. The sending device 102 may include the same or similar components and may perform the same or similar operations as the receiving device 104 described with respect to FIG. 1.

For example, the receiving device 104 and/or the sending device 102 may determine if and when to adjust an transmission unit size for data transmission between the receiving device 104 and the sending device 102. For example, one or more RSSI thresholds may be determined and utilized to determine whether transmission unit size should be adjusted based at least in part on received RSSI values between the receiving device 104 and the sending device 102. For example, a first threshold indicating low RSSI values and a second threshold indicating high RSSI values may be established. It should be understood that while two thresholds are utilized in this examples, one, two, or more than two thresholds may be established and utilized. Additionally, instead of or in addition to utilizing thresholds, certain reference RSSI values may be predetermined and those reference RSSI values may correspond to transmission unit sizes.

In the example of FIG. 2A, RSSI values may be exchanged between the receiving device 104 and the sending device 102. Those RSSI values may indicate a communication strength for data transmission between the devices

102, 104. These RSSI values may be exchanged continuously, periodically, and/or based at least in part on a command to exchange RSSI values that may be generated and/or utilized based at least in part on one or more triggering events occurring, as described in more detail elsewhere herein. An RSSI component of the sending device 104 and/or the receiving device 102 may receive the RSSI values and determine whether the RSSI values indicate that he transmission unit size should be adjusted. In the example of FIG. 2A, the RSSI values are shown to not satisfy either of the first threshold RSSI value or the second threshold RSSI value. In these examples, the RSSI values indicate that the receiving device 104 is at a distance from the sending device 102 or otherwise is communicating with the sending device 104 in a way where the default transmission unit size agreed upon between the devices 102, 104 is the optimal transmission unit size for data transmission.

Figure 2B:
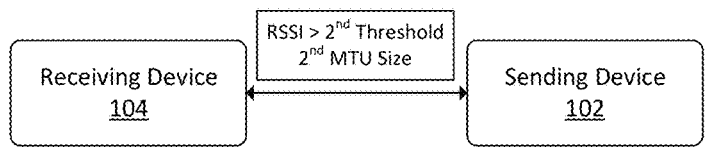
FIG. 2B illustrates another example of communication characteristics between a receiving device and a sending device.

FIG. 2B illustrates another example of communication characteristics between a receiving device 104 and a sending device 102. The receiving device 104 may include the same or similar components and may perform the same or similar operations as the receiving device 104 described with respect to FIG. 1. The sending device 102 may include the same or similar components and may perform the same or similar operations as the receiving device 104 described with respect to FIG. 1.

For example, the receiving device 104 and/or the sending device 102 may determine if and when to adjust an transmission unit size for data transmission between the receiving device 104 and the sending device 102. For example, one or more RSSI thresholds may be determined and utilized to determine whether transmission unit size should be adjusted based at least in part on received RSSI values between the receiving device 104 and the sending device 102. In examples, a first threshold indicating low RSSI values and a second threshold indicating high RSSI values may be established. It should be understood that while two thresholds are utilized in this examples, one, two, or more than two thresholds may be established and utilized. Additionally, instead of or in addition to utilizing thresholds, certain reference RSSI values may be predetermined and those reference RSSI values may correspond to transmission unit sizes.

In the example of FIG. 2B, RSSI values may be exchanged between the receiving device 104 and the sending device 102. Those RSSI values may indicate a communication strength for data transmission between the devices 102, 104. These RSSI values may be exchanged continuously, periodically, and/or based at least in part on a command to exchange RSSI values that may be generated and/or utilized based at least in part on one or more triggering events occurring, as described in more detail elsewhere herein. An RSSI component of the sending device 104 and/or the receiving device 102 may receive the RSSI values and determine whether the RSSI values indicate that he transmission unit size should be adjusted. In the example of FIG. 2B, the RSSI values are shown to satisfy the second threshold RSSI value, indicating that the RSSI values are high. In these examples, the RSSI values indicate that the receiving device 104 is at a close distance from the sending device 102 or otherwise is communicating with the sending device 104 in a way where the transmission unit size may be adjusted to be smaller than the default transmission unit size for optimal data transmission. In this example, the transmission unit size may allow for decreased latency in the transmission of data between the receiving device 104 and the sending device 102.

Figure 2C:
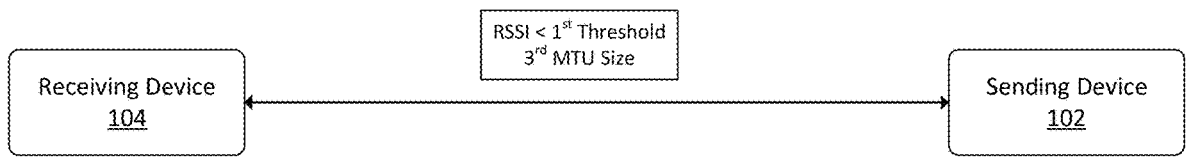
FIG. 2C illustrates another example of communication characteristics between a receiving device and a sending device.

FIG. 2C illustrates another example of communication characteristics between a receiving device 104 and a sending device 102. The receiving device 104 may include the same or similar components and may perform the same or similar operations as the receiving device 104 described with respect to FIG. 1. The sending device 102 may include the same or similar components and may perform the same or similar operations as the receiving device 104 described with respect to FIG. 1.

For example, the receiving device 104 and/or the sending device 102 may determine if and when to adjust an transmission unit size for data transmission between the receiving device 104 and the sending device 102. For example, one or more RSSI thresholds may be determined and utilized to determine whether transmission unit size should be adjusted based at least in part on received RSSI values between the receiving device 104 and the sending device 102. In examples, a first threshold indicating low RSSI values and a second threshold indicating high RSSI values may be established. It should be understood that while two thresholds are utilized in this examples, one, two, or more than two thresholds may be established and utilized. Additionally, instead of or in addition to utilizing thresholds, certain reference RSSI values may be predetermined and those reference RSSI values may correspond to transmission unit sizes.

In the example of FIG. 2C, RSSI values may be exchanged between the receiving device 104 and the sending device 102. Those RSSI values may indicate a communication strength for data transmission between the devices 102, 104. These RSSI values may be exchanged continuously, periodically, and/or based at least in part on a command to exchange RSSI values that may be generated and/or utilized based at least in part on one or more triggering events occurring, as described in more detail elsewhere herein. An RSSI component of the sending device 104 and/or the receiving device 102 may receive the RSSI values and determine whether the RSSI values indicate that he transmission unit size should be adjusted. In the example of FIG. 2C, the RSSI values are shown to satisfy the first threshold RSSI value, indicating that the RSSI values are low. In these examples, the RSSI values indicate that the receiving device 104 is at a far distance from the sending device 102 or otherwise is communicating with the sending device 104 in a way where the transmission unit size may be adjusted to be larger than the default transmission unit size for optimal data transmission. In this example, the transmission unit size may allow for increased throughput of data utilizing fewer data packets between the receiving device 104 and the sending device 102. In this example, the receiving device 104 will be required to utilize fewer data packet acknowledgements, freeing up computing resources for the processing of the larger data packets.

Figure 3:
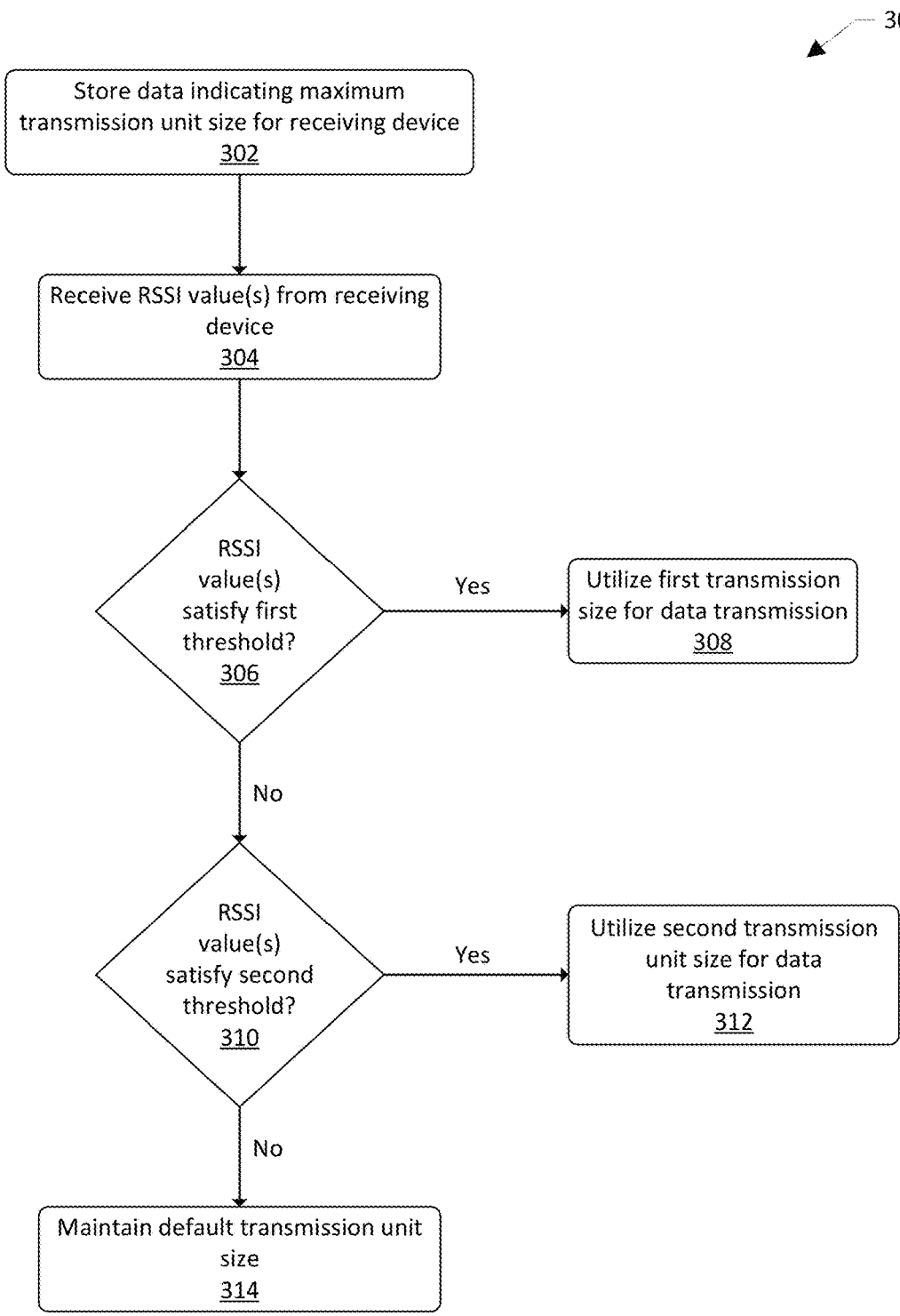
FIG. 3 illustrates a flow diagram of an example process for dynamic transmission unit sizing.
Figure 4:
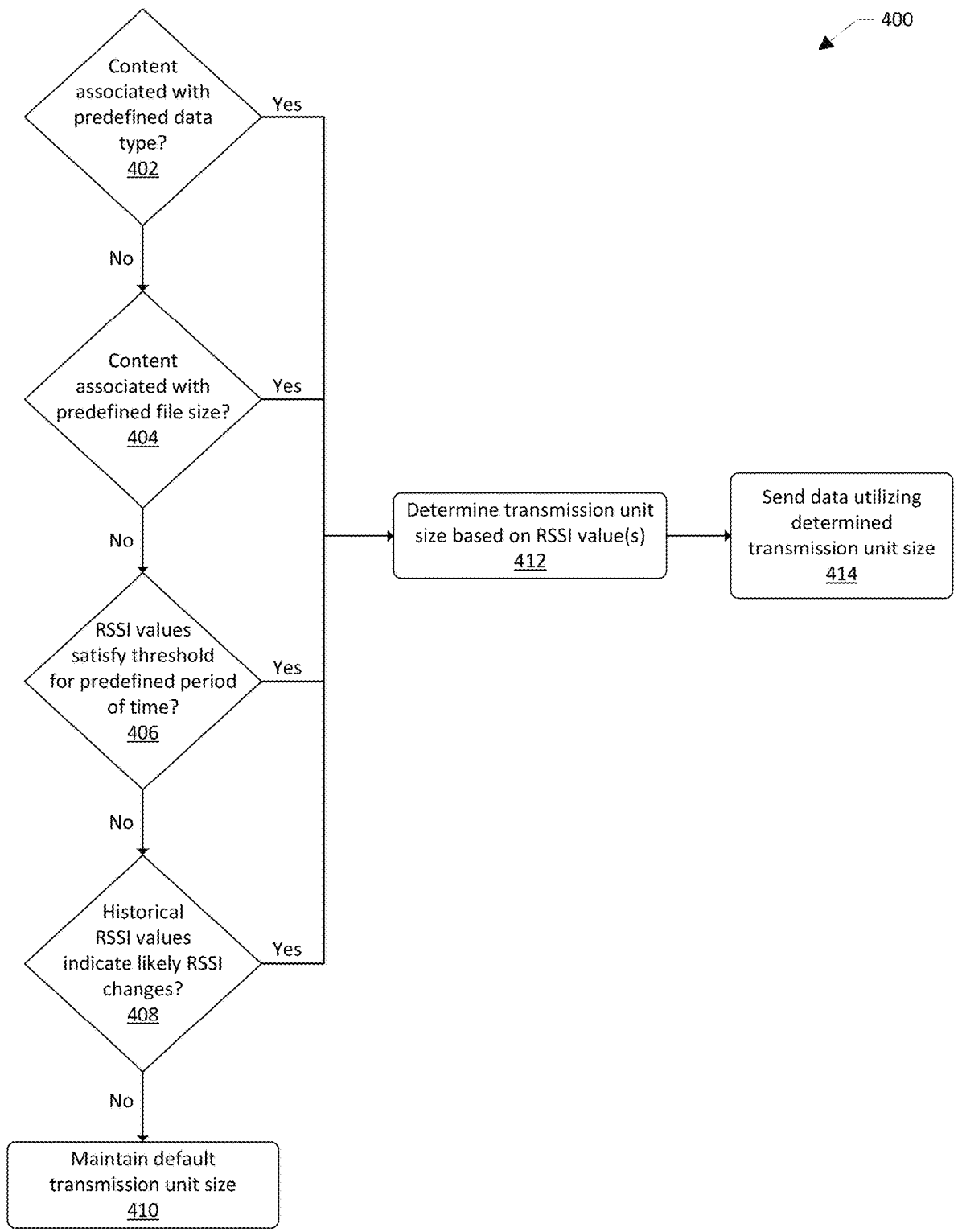
FIG. 4 illustrates a flow diagram of an example process for initiating dynamic transmission unit sizing.

FIGS. 3 and 4 illustrate processes for dynamic transmission unit determination. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-2C and 5-8, although the processes may be implemented in a wide variety of other environments, architectures and systems.

FIG. 3 illustrates a flow diagram of an example process 300 for dynamic transmission unit determination. The order in which the operations or steps are described is not intended to be construed as a limitation, and any number of the described operations may be combined in any order and/or in parallel to implement process 300.

At block 302, the process 300 may include storing data indicating a maximum transmission unit size for a receiving device. For example, device-configuration components of a sending device and a receiving device may communicate each transmission unit size to the other device and may identify a default transmission unit size that both devices accept for sending data packets. In these examples, the sending device may receive data indicating the transmission unit size for the receiving device and may accept that transmission unit size for data transmission with the receiving device. Generally, once the transmission unit size is agreed upon between the sending device and the receiving device, the transmission unit size remains static until changed as described herein.

At block 304, the process 300 may include receiving one or more RSSI values from the receiving device. For example, an RSSI component may be configured to receive RSSI values and determine whether the RSSI values indicate that transmission unit size should be adjusted. In examples, the devices may exchange RSSI values continuously, near continuously, periodically, and/or upon detection of a trigger event as described more fully herein.

At block 306, the process 300 may include determining whether the RSSI values satisfy a first threshold. For example, a given RSSI value may correspond to a given transmission unit size, such as an RSSI value of −30 decibels corresponding to an transmission unit size of 1,000, and/or an RSSI value of −35 decibels corresponding to an transmission unit size of 973, etc. In other examples, the RSSI component may determine whether the RSSI value satisfies one or more RSSI value thresholds and may determine the transmission unit size based at least in part on the transmission unit size associated with the one or more RSSI value thresholds. For example, an RSSI value of −30 may satisfy a threshold of −35 but not a threshold of −25, and an transmission unit size corresponding to an RSSI value between those two thresholds may be utilized. It should be understood that additional or alternative data other than RSSI values may be utilized to determine communication abilities between devices. Such other data may include data indicating a state of one or more of the devices, a battery level of one or more of the devices, a communication mode of the one or more devices, etc.

In examples where the RSSI values satisfy the first threshold, the process 300 may include, at block 308, utilizing a first transmission unit size for data transmission with the receiving device. For example, an transmission unit sizing component may receive data from the RSSI component indicating the transmission unit size to be utilized for data transmission with the receiving device, and/or the transmission unit sizing component may receive the RSSI values from the RSSI component and may determine the transmission unit size associated with the RSSI value and/or range of RSSI values. The transmission unit sizing component may be configured to adjust the transmission unit size for data packets sent to and from the receiving device to the transmission unit size determined as described herein. The transmission unit size may remain the same until additional transmission unit sizing processes are performed, in examples.

In examples where the RSSI values do not satisfy the first threshold, the process 300 may include, at block 310, determining whether the RSSI values satisfy a second threshold. In examples, the first threshold may indicate low RSSI values indicating, for example, that the devices are far from each other or communication is otherwise impeded, while the second threshold may indicate high RSSI values indicating, for example, that the devices are near each other or communication is otherwise improved. Determining whether the RSSI values satisfy the second threshold may be performed in the same or a similar manner as determining whether the RSSI values satisfy the first threshold.

In examples where the RSSI values satisfy the second threshold, the process 300 may include, at block 312, utilizing the second transmission unit size for data transmission with the receiving device. The transmission unit sizing component may adjust the transmission unit size to the second transmission unit size in the same or a similar manner as adjustment of the transmission unit size to the first transmission unit size.

In examples where the RSSI values do not satisfy the second threshold, the process 300 may include, at block 314, maintaining the transmission unit size, such as at a default transmission unit size. In these examples, it may be determined that the RSSI values indicate that the devices are at a distance from each other or otherwise are communicating in a manner where the default transmission unit size is sufficient and/or optimal for data transmission.

FIG. 4 illustrates a flow diagram of an example process 400 for initiating dynamic transmission unit determination. The order in which the operations or steps are described is not intended to be construed as a limitation, and any number of the described operations may be combined in any order and/or in parallel to implement process 400.

At block 402, the process 400 may include determining whether content to be sent from a sending device to a receiving device is associated with a predefined data type. For example, a communication component of the sending device may receive data representing content to be transmitted between the devices. The sending device may determine a data type associated with the content. In examples where the data type corresponds to a predefined data type, initiation of determining whether to adjust the transmission unit size may occur. For example, when the content corresponds to image data or otherwise to data that has been designated as a predefined data type for transmission unit size adjustment, an RSSI component may receive data representing RSSI values from the receiving device and/or may utilize the data representing the RSSI values that has already been received from the receiving device.

In examples where the content is not associated with a predefined data type, the process 400 may include, at block 404, determining whether the content is associated with a predefined file size. For example, the triggering event may occur when the content is associated with at least a predefined file size indicating that the content is a large file.

In examples where the content is not associated with the predefined file size, the process 400 may include, at block 406, determining whether one or more RSSI values satisfy a threshold value for a predetermined period of time. For example, the sending device may receive RSSI values from the receiving device over time. When the RSSI values satisfy a given threshold value for a threshold period of time, the transmission unit size adjustment processes described herein may be initiated. For example, RSSI values may be exchanged between the receiving device and the sending device continuously and/or periodically, even when content is not transmitted between devices. Thresholds for high RSSI values and/or low RSSI values may be determined, and when the RSSI values exchanged between the devices satisfy one or more of those thresholds for a given period of time, transmission unit size adjustment processes may be initiated. For example, a receiving device may be mobile and may move frequently to be nearer or farther from the sending device over time. When the receiving device is near the sending device, the RSSI value may be high. When the receiving device is far from the sending device, the RSSI value may be low. In other examples, characteristics such as objects impeding communication between devices may be present and/or a state of one or more of the devices, such as based on battery life, may affect the RSSI values. In these examples, when the RSSI value changes more than a threshold amount, the transmission unit size adjustment processes described herein may be initiated.

In examples where the RSSI values do not satisfy the threshold value for the predetermined period of time, the process 400 may include, at block 408, determining whether historical RSSI values indicate that an RSSI value change is likely to occur, such as at a given time, on a given day, and/or during a given period of time. For example, historical RSSI values associated with the receiving device and/or the sending device may be utilized to determine when to initiate transmission unit size adjustment processes. For example, the historical RSSI values may indicate a time of day, a day of the week, and/or a period of time when RSSI values are predicted to satisfy threshold RSSI values for transmission unit size adjustment. The RSSI values received during such periods of time may be utilized to determine whether to adjust the transmission unit size. It should be understood that the triggering events described herein are provided by way of example, and this disclosure includes any event that may inform the decision to initiate transmission unit size adjustment. In examples, a command generator of the sending device may generate and send commands to the receiving device instructing the receiving device to provide RSSI values, such as based at least in part on determining that one or more of the triggering events has occurred.

In examples where the historical RSSI values do not indicate that an RSSI value change is likely to occur, the process 400 may include, at block 410, maintaining an transmission unit size at a default transmission unit size or otherwise not adapting the transmission unit size based at least in part on RSSI values. In these examples, it may be determined that the RSSI values indicate that the devices are at a distance from each other or otherwise are communicating in a manner where the default transmission unit size is sufficient and/or optimal for data transmission.

In examples where the content is associated with the predefined data type, and/or where the content is associated with the predefined file size, and/or where the RSSI values satisfy the threshold value for the predefined period of time, and/or where the historical RSSI values indicate that an RSSI value change is likely, the process 400 may include, at block 412, determining an transmission unit size based at least in part on the RSSI values. For example, an transmission unit sizing component may receive data from the RSSI component indicating the transmission unit size to be utilized for data transmission with the receiving device, and/or the transmission unit sizing component may receive the RSSI values from the RSSI component and may determine the transmission unit size associated with the RSSI value and/or range of RSSI values. The transmission unit sizing component may be configured to adjust the transmission unit size for data packets sent to and from the receiving device to the transmission unit size determined as described herein. The transmission unit size may remain the same until additional transmission unit sizing processes are performed, in examples.

At block 414, the process 400 may include sending data utilizing the determined transmission unit size. For example, the communication component of the sending device may receive content to be sent to the receiving device and may send data representing the content to the receiving device in data packets associated with the transmission unit size. The communication component may also receive data sent by the receiving device in the form of data packets associated with the transmission unit size. The command generator may be configured to generate and send commands to the receiving device instructing the receiving device to send data packets utilizing the transmission unit size as determined above. In examples, the communication protocol that may be utilized for data packet transmission may be a short-range communication protocol such as Bluetooth and/or Bluetooth Low Energy.

Figure 5:
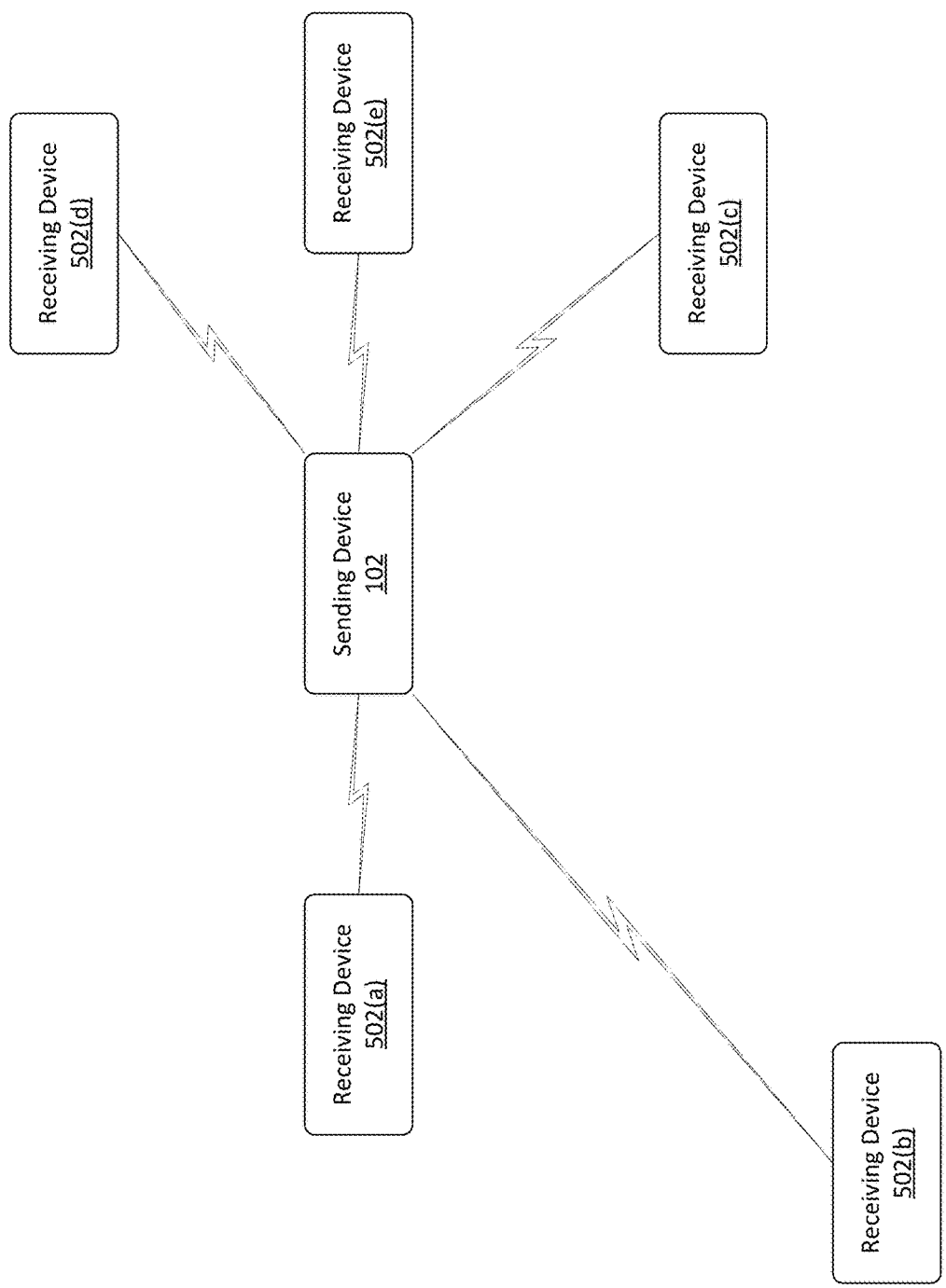
FIG. 5 illustrates a conceptual diagram of communications between a sending device and multiple receiving devices.

FIG. 5 illustrates a conceptual diagram of communications between a sending device 102 and multiple receiving devices 502(a)-(e). As illustrated in FIG. 5, multiple electronic devices may be in communication with each other. The electronic device(s) that are transmitting content, such as image data, audio data, text data, etc. may be considered the sending device(s) 102. The sending device 102 illustrated in FIG. 5 may have the same or similar components and may operate in the same or a similar manner as the sending device 102 described with respect to FIG. 1. The electronic device(s) that are receiving content may be considered the receiving devices 502(a)-(e). The receiving devices 502(a)-(e) may have the same or similar components and may perform the same or similar functions as the receiving devices 104 described with respect to FIG. 1. It should also be understood that while FIG. 5 illustrates one sending device 102, one or more than one sending device 102 may be present. Additionally, while FIG. 5 illustrates five receiving devices 502(a)-(e), it should be understood that there may be one, two, three, four, five, or more than five receiving devices 502(a)-(e).

As shown in FIG. 5, the receiving devices 502(a)-(e) may be positioned at different distances from the sending device 102. Additionally, in examples, the receiving devices 502(a)-(e) may have varying communication qualities with the sending device 102, which may be due to factors such as the hardware and/or software configurations of the devices, objects impeding communication between the devices, states of the devices, and/or attributes of the functionality of the devices such as battery level. In these examples, the RSSI values associated with communications between the devices may differ. For example, the RSSI values between the sending device 102 and the receiving device 502(a) may be higher than the RSSI values between the sending device 102 and the receiving device 502(b). In still other examples, even when the distance between the sending device 102 and multiple receiving devices 502(a), 502(e) are the same, due to one or more of the other factors described herein, the RSSI values may differ. The sending device 102 and/or the receiving device(s) 502(*a*)-(*e*) may be configured to perform the RSSI value analysis and transmission unit sizing processes described herein with respect to some or each of the receiving devices 502(*a*)-(*e*). In these examples, data transmission between the sending device 102 and a given receiving device 502(*a*) may be associated with a first transmission unit size while data transmission between the sending device 102 and another receiving device 502(*c*) may be associated with a second transmission unit size. The devices may be configured to store indications of the transmission unit sizing to be utilized for data transmission between various devices and may utilize such indications to format transmission unit sizing.

Figure 6:
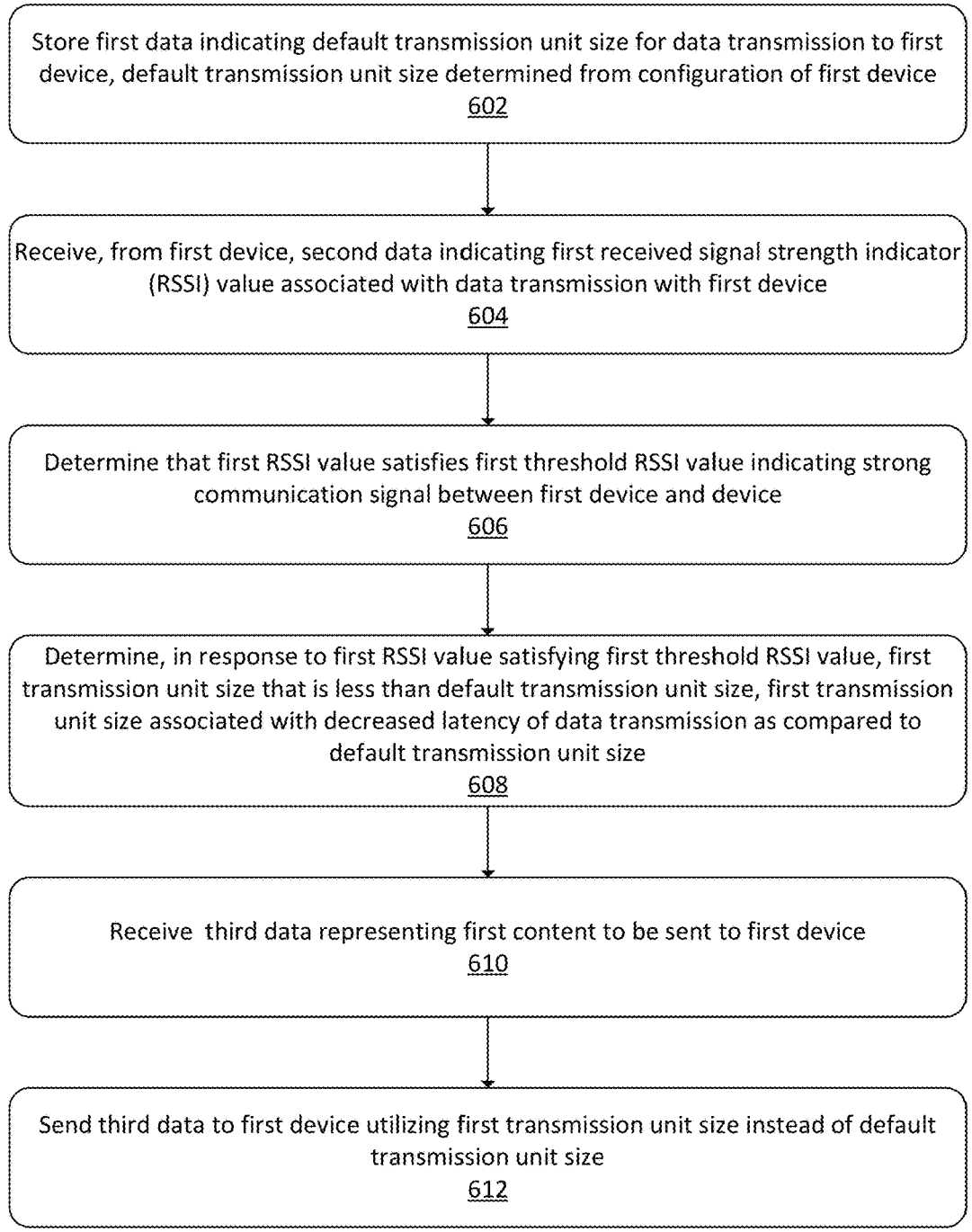
FIG. 6 illustrates a flow diagram of an example process for dynamic transmission unit sizing.
Figure 7:
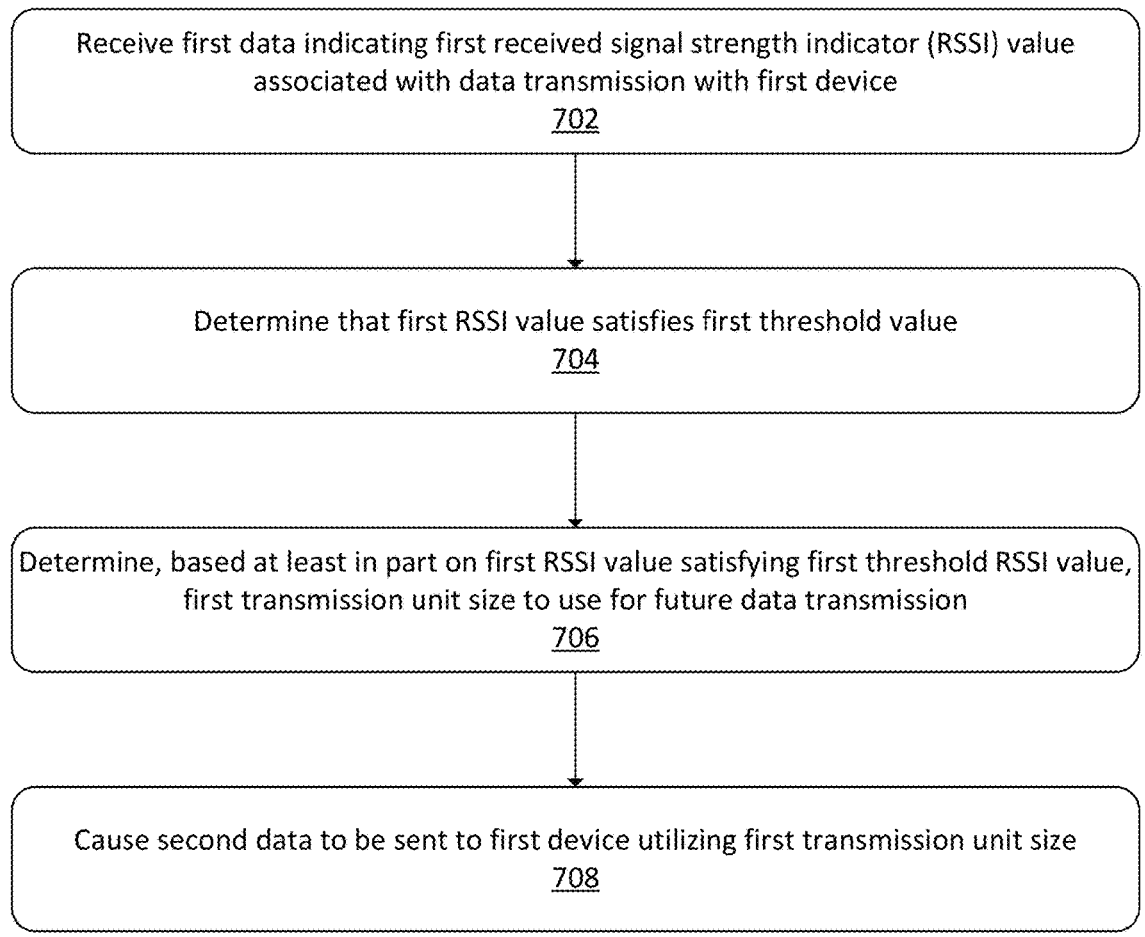
FIG. 7 illustrates a flow diagram of another example process for dynamic transmission unit sizing.

FIGS. 6 and 7 illustrate processes for dynamic transmission unit sizing. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5 and 8, although the processes may be implemented in a wide variety of other environments, architectures and systems.

FIG. 6 illustrates a flow diagram of an example process 600 for dynamic transmission unit sizing. The order in which the operations or steps are described is not intended to be construed as a limitation, and any number of the described operations may be combined in any order and/or in parallel to implement process 600.

At block 602, the process 600 may include storing first data indicating a default transmission unit size for data transmission to a first device, the default transmission unit size determined from a configuration of the first device. For example, device-configuration components of a sending device and a receiving device may communicate each transmission unit size to the other device and may identify a default transmission unit size that both devices accept for sending data packets. In these examples, the sending device may receive data indicating the transmission unit size for the receiving device and may accept that transmission unit size for data transmission with the receiving device. Generally, once the transmission unit size is agreed upon between the sending device and the receiving device, the transmission unit size remains static until changed as described herein.

At block 604, the process 600 may include receiving, from the first device, second data indicating a first received signal strength indicator (RSSI) value associated with the data transmission with the first device. For example, an RSSI component may be configured to receive RSSI values and determine whether the RSSI values indicate that transmission unit size should be adjusted. In examples, the devices may exchange RSSI values continuously, near continuously, periodically, and/or upon detection of a trigger event as described more fully herein.

At block 606, the process 600 may include determining that the first RSSI value satisfies a first threshold RSSI value indicating a strong communication signal between the first device and the device. For example, a given RSSI value may correspond to a given transmission unit size, such as an RSSI value of −30 decibels corresponding to an transmission unit size of 1,000, and/or an RSSI value of −35 decibels corresponding to an transmission unit size of 973, etc. In other examples, the RSSI component may determine whether the RSSI value satisfies one or more RSSI value thresholds and may determine the transmission unit size based at least in part on the transmission unit size associated with the one or more RSSI value thresholds. For example, an RSSI value of −30 may satisfy a threshold of −35 but not a threshold of −25, and an transmission unit size corresponding to an RSSI value between those two thresholds may be utilized. It should be understood that additional or alternative data other than RSSI values may be utilized to determine communication abilities between devices. Such other data may include data indicating a state of one or more of the devices, a battery level of one or more of the devices, a communication mode of the one or more devices, etc.

It should be understood that when "strong" is used to describe a communication signal, that term is utilized to indicate that the RSSI value satisfies a threshold RSSI value determined to indicate that communication parameters associated transmission of data between devices is favorable. Communication strength may, in examples, be dependent at least in part on the protocol utilized for communication. For example, a strong Bluetooth signal may be associated with RSSI values of −35 or more, while a weak Bluetooth signal may be associated with RSSI values of −75 or less. For WiFi, RSSI values of −50 or more may be considered strong, while RSSI values of −70 or less may be considered weak.

At block 608, the process 600 may include determining, in response to the first RSSI value satisfying the first threshold RSSI value, a first transmission unit size that is less than the default transmission unit size, the first transmission unit size associated with decreased latency of the data transmission as compared to the default transmission unit size. For example, an transmission unit sizing component may receive data from the RSSI component indicating the transmission unit size to be utilized for data transmission with the receiving device, and/or the transmission unit sizing component may receive the RSSI values from the RSSI component and may determine the transmission unit size associated with the RSSI value and/or range of RSSI values. The transmission unit sizing component may be configured to adjust the transmission unit size for data packets sent to and from the receiving device to the transmission unit size determined as described herein. The transmission unit size may remain the same until additional transmission unit sizing processes are performed, in examples.

At block 610, the process 600 may include receiving third data representing first content to be sent to the first device. For example, the content may be received from one or more devices associated with the environment and/or from a remote system.

At block 612, the process 600 may include sending the third data to the first device utilizing the first transmission unit size instead of the default transmission unit size. For example, the communication component of the sending device may receive content to be sent to the receiving device and may send data representing the content to the receiving device in data packets associated with the transmission unit size. The communication component may also receive data sent by the receiving device in the form of data packets associated with the transmission unit size. The command generator may be configured to generate and send commands to the receiving device instructing the receiving device to send data packets utilizing the transmission unit size as determined above. In examples, the communication protocol that may be utilized for data packet transmission may be a short-range communication protocol such as Bluetooth and/or Bluetooth Low Energy.

Additionally, or alternatively, the process 600 may include receiving, from the first device, fourth data indicating a second RSSI value associated with the data transmission with the first device. The process 600 may also include determining that the second RSSI value satisfies a second threshold RSSI value indicating a weak communication signal between the first device and the device. The process 600 may also include determining, in response to the second RSSI value satisfying the second threshold RSSI value, a second transmission unit size that is more than the default transmission unit size, the second transmission unit size associated with increased throughput of data packets in relation to the default transmission unit size. The process 600 may also include receiving fifth data representing second content to be sent to the first device and sending the fifth data to the first device utilizing the second transmission unit size.

Additionally, or alternatively, the process 600 may include storing an indicator of the first transmission unit size for the data transmission between the first device and the device. The process 600 may also include determining that the first content is be sent to the first device and determining a data size associated with the first content. The process 600 may also include generating data packets for transmission to the first device, individual ones of the data packets including a header portion having a fixed number of bytes and a payload portion having a number of bytes of the first content, the number of bytes of the first content representing the first transmission unit size minus the fixed number of bytes of the header portion. In these examples, sending the third data utilizing the first transmission unit size may include sending the data packets with the payload portion having the number of bytes Additionally, or alternatively, the process 600 may include determining that the third data corresponds at least in part to image data. The process 600 may also include generating, in response to determining that the third data corresponds at least in part to the image data, a command requesting the first RSSI value from the receiving device. The process 600 may also include sending the command to the receiving device. In these examples, receiving the second data indicating the first RSSI value may be in response to the command. The process 600 may also include determining a latency of data transmission associated with the historical RSSI values. In these examples, determining the first transmission unit size includes selecting the first transmission unit size such that the latency is reduced.

Additionally, or alternatively, the process 600 may include determining, utilizing historical RSSI values received from the receiving device, a time period when RSSI values are expected to change between the receiving device and the device. The process 600 may also include determining a time to send a command requesting the first RSSI value utilizing the time period. The process 600 may also include sending the command at the time. In these examples, receiving the second data indicating the first RSSI value may be in response to the command.

FIG. 7 illustrates a flow diagram of another example process for dynamic transmission unit determination. The order in which the operations or steps are described is not intended to be construed as a limitation, and any number of the described operations may be combined in any order and/or in parallel to implement process 700.

At block 702, the process 700 may include receiving first data indicating a first received signal strength indicator (RSSI) value associated with data transmission with the first device. For example, an RSSI component may be configured to receive RSSI values and determine whether the RSSI values indicate that transmission unit size should be adjusted. In examples, the devices may exchange RSSI values continuously, near continuously, periodically, and/or upon detection of a trigger event as described more fully herein.

At block 704, the process 700 may include determining that the first RSSI value satisfies a first threshold value. For example, a given RSSI value may correspond to a given transmission unit size, such as an RSSI value of –30 decibels corresponding to an transmission unit size of 1,000, and/or an RSSI value of –35 decibels corresponding to an transmission unit size of 973, etc. In other examples, the RSSI component may determine whether the RSSI value satisfies one or more RSSI value thresholds and may determine the transmission unit size based at least in part on the transmission unit size associated with the one or more RSSI value thresholds. For example, an RSSI value of –30 may satisfy a threshold of –35 but not a threshold of –25, and an transmission unit size corresponding to an RSSI value between those two thresholds may be utilized. It should be understood that additional or alternative data other than RSSI values may be utilized to determine communication abilities between devices. Such other data may include data indicating a state of one or more of the devices, a battery level of one or more of the devices, a communication mode of the one or more devices, etc.

At block 706, the process 700 may include determining, based at least in part on the first RSSI value satisfying the first threshold RSSI value, a first transmission unit size to use for future data transmission. For example, an transmission unit sizing component may receive data from the RSSI component indicating the transmission unit size to be utilized for data transmission with the receiving device, and/or the transmission unit sizing component may receive the RSSI values from the RSSI component and may determine the transmission unit size associated with the RSSI value and/or range of RSSI values. The transmission unit sizing component may be configured to adjust the transmission unit size for data packets sent to and from the receiving device to the transmission unit size determined as described herein. The transmission unit size may remain the same until additional transmission unit sizing processes are performed, in examples.

At block 708, the process 700 may include causing second data to be sent to the first device utilizing the first transmission unit size. For example, the communication component of the sending device may receive content to be sent to the receiving device and may send data representing the content to the receiving device in data packets associated with the transmission unit size. The communication component may also receive data sent by the receiving device in the form of data packets associated with the transmission unit size. The command generator may be configured to generate and send commands to the receiving device instructing the receiving device to send data packets utilizing the transmission unit size as determined above. In examples, the communication protocol that may be utilized for data packet transmission may be a short-range communication protocol such as Bluetooth and/or Bluetooth Low Energy.

Additionally, or alternatively, the process 700 may include receiving, from the first device, third data indicating a second RSSI value associated with the data transmission with the first device. The process 700 may also include determining that the second RSSI value satisfies a second threshold RSSI value. The process 700 may also include determining, based at least in part on the second RSSI value satisfying the second threshold RSSI value, a second transmission unit size that is more than the default transmission unit size. The process 700 may also include sending fourth data to the first device utilizing the second transmission unit size.

Additionally, or alternatively, the process 700 may include determining that the second data corresponds at least in part to image data. The process 700 may also include generating, based at least in part on determining that the second data corresponds at least in part to the image data, a command requesting the first RSSI value from the first device. The process 700 may also include sending the command to the first device. In these examples, receiving the first data may be in response to the command.

Additionally, or alternatively, the process 700 may include determining, based at least in part on historical RSSI values received from the first device, a time period when RSSI values are expected to change between the first device and a second device. The process 700 may also include determining when to send a command requesting the first RSSI value based at least in part on the time period.

Additionally, or alternatively, the process 700 may include determining that the second data has a file size that satisfies a threshold file size. The process 700 may also include generating, based at least in part on the file size satisfying the threshold file size, a command requesting the first RSSI value from the first device. The process 700 may also include sending the command to the first device. In these examples, receiving the first data may be in response to the command.

Additionally, or alternatively, the process 700 may include determining, from third data received from the first device, that the first RSSI value satisfies the first threshold RSSI value for a threshold period of time. In these examples, determining the first transmission unit size may be based at least in part on the first RSSI value satisfying the first threshold RSSI value for the threshold period of time.

Additionally, or alternatively, the process 700 may include determining a performance metric associated with sending of the second data utilizing the first transmission unit size, the performance metric indicating at least one of a latency associated with sending the second data or a number of dropped packets associated with sending the second data. The process 700 may also include determining a second transmission unit size to associate with the data transmission based at least in part on the performance metric.

Additionally, or alternatively, the process 700 may include receiving third data indicating an operational mode of the first device, the operational model associated with a battery level of the first device. In these examples, determining the first transmission unit size may be based at least in part on the third data.

Additionally, or alternatively, the process 700 may include receiving third data indicating RSSI values associated with the data transmission with the computing device over a period of time. The process 700 may also include determining that the RSSI values include the first RSSI value and a second RSSI value that differs from the first RSSI value. The process 700 may also include determining that the first RSSI value indicates less favorable data transmission than the second RSSI value. The process 700 may also include selecting the first RSSI value to utilize for determining the first transmission unit size based at least in part on the first RSSI value indicating less favorable data transmission than the second RSSI value.

Figure 8:
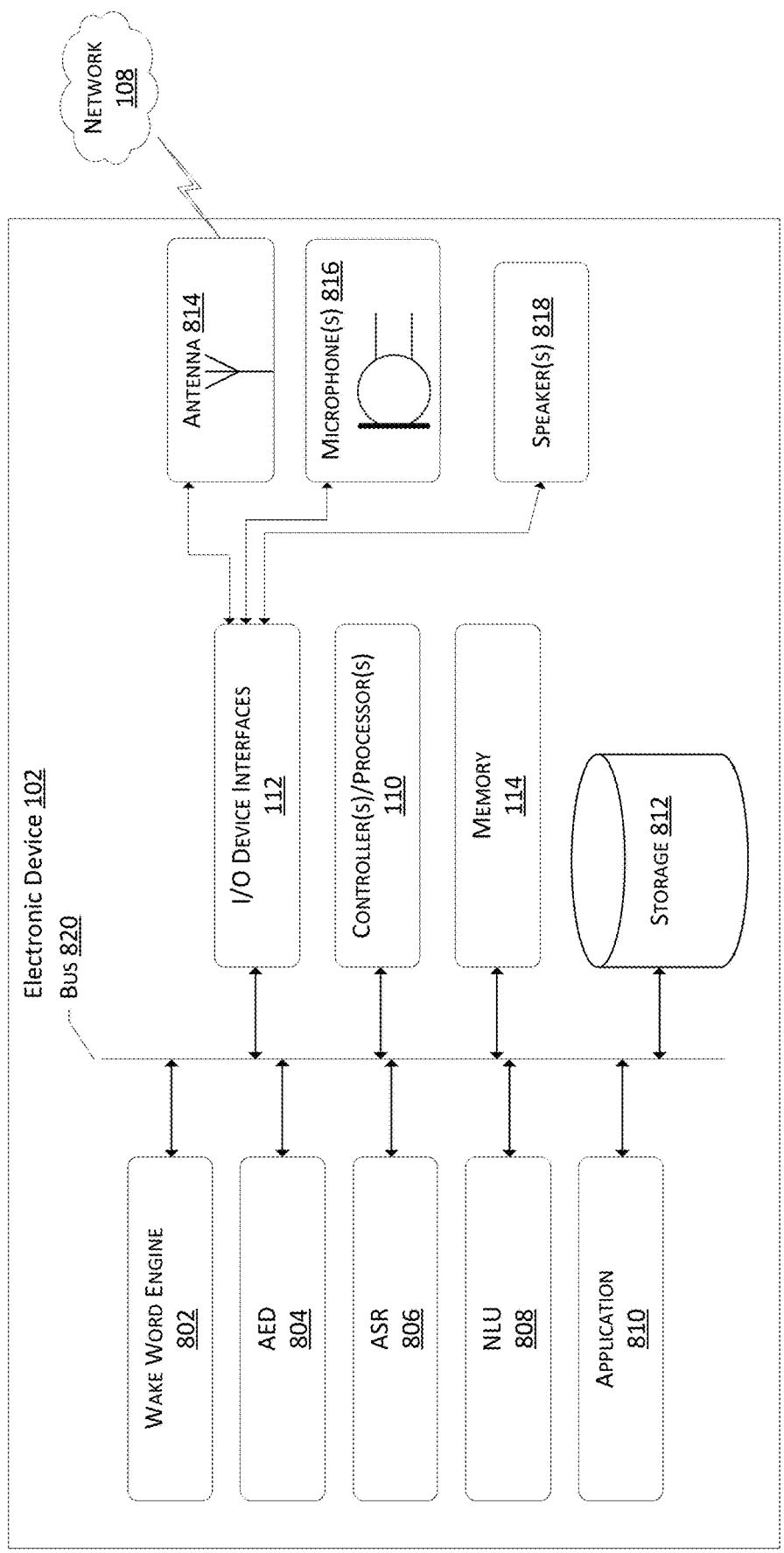
FIG. 8 illustrates a conceptual diagram of example components of an electronic device that may be utilized in association with dynamic transmission unit sizing.

FIG. 8 illustrates a conceptual diagram of example components of an electronic device 102 that may be utilized in association with configurations for identifying aid providers during emergent situations. The device 102 may be implemented as a standalone device 102 that is relatively simple in terms of functional capabilities with limited input/output components, memory, and processing capabilities. For instance, the device 102 may not have a keyboard, keypad, or other form of mechanical input. The device 102 may also lack a display (other than simple lights, for instance) and a touch screen to facilitate visual presentation and user touch input. Instead, the device 102 may be implemented with the ability to receive and output audio, a network interface (wireless or wire-based), power, and processing/memory capabilities. In certain implementations, a limited set of one or more input components may be employed (e.g., a dedicated button to initiate a configuration, power on/off, etc.) by the device 102. Nonetheless, the primary, and potentially only mode, of user interaction with the device 102 is through voice input and audible output. In some instances, the device 102 may simply comprise a microphone 816, a power source, and functionality for sending generated audio data via one or more antennas 814 to another device.

The device 102 may also be implemented as a more sophisticated computing device, such as a computing device similar to, or the same as, a smart phone or personal digital assistant. The device 102 may include a display with a touch interface and various buttons for providing input as well as additional functionality such as the ability to send and receive communications. Alternative implementations of the device 102 may also include configurations as a personal computer. The personal computer may include a keyboard, a mouse, a display, and other hardware or functionality that is found on a desktop, notebook, netbook, or other personal computing devices. In examples, the device 102 may include an automobile, such as a car. In other examples, the device 102 may include a pin on a user's clothes or a phone on a user's person. In examples, the device 102 and may not include speaker(s) and may utilize speaker(s) of an external or peripheral device to output audio via the speaker(s) of the external/peripheral device. In this example, the device 102 might represent a set-top box (STB), and the device 102 may utilize speaker(s) of another device such as a television that is connected to the STB for output of audio via the external speakers. In other examples, the device 102 may not include the microphone(s) 816, and instead, the device 102 can utilize microphone(s) of an external or peripheral device to capture audio and/or generate audio data. In this example, the device 102 may utilize microphone(s) of a headset that is coupled (wired or wirelessly) to the device 102. These types of devices are provided by way of example and are not intended to be limiting, as the techniques described in this disclosure may be used in essentially any device that has an ability to recognize speech input or other types of natural language input.

The device 102 of FIG. 8 may include one or more controllers/processors 110, that may include a central processing unit (CPU) for processing data and computer-readable instructions, and memory 114 for storing data and instructions of the device 102. The device 102 may also be connected to removable or external non-volatile memory and/or storage, such as a removable memory card, memory key drive, networked storage, etc., through input/output device interfaces 112.

Computer instructions for operating the device 102 and its various components may be executed by the device's controller(s)/processor(s) 110, using the memory 114 as temporary "working" storage at runtime. A device's computer instructions may be stored in a non-transitory manner in non-volatile memory 114, storage 812, or an external device(s). Alternatively, some or all of the executable instructions may be embedded in hardware or firmware on the device 102 in addition to or instead of software.

The device 102 may include input/output device interfaces 112. A variety of components may be connected through the input/output device interfaces 112. Additionally, the device 102 may include an address/data bus 820 for conveying data among components of the respective device. Each component within a device 102 may also be directly connected to other components in addition to, or instead of, being connected to other components across the bus 820.

The device 102 may include a display, which may comprise a touch interface. Any suitable display technology, such as liquid crystal display (LCD), organic light emitting diode (OLED), electrophoretic, and so on, may be utilized for the displays. Furthermore, the processor(s) 110 may comprise graphics processors for driving animation and video output on the associated display, or the device 102 may be "headless" and may primarily rely on spoken commands for input. As a way of indicating to a user that a connection between another device has been opened, the device 102 may be configured with one or more visual indicators, such as the light elements(s), which may be in the form of LED(s) or similar components (not illustrated), that may change color, flash, or otherwise provide visible light output, such as for a notification indicator on the device 102. The input/output device interfaces 112 that connect to a variety of components. This wired or a wireless audio and/or video port may allow for input/output of audio/video to/from the device 102. The device 102 may also include an audio capture component. The audio capture component may be, for example, a microphone 816 or array of microphones, a wired headset or a wireless headset, etc. The microphone 816 may be configured to capture audio. If an array of microphones is included, approximate distance to a sound's point of origin may be determined using acoustic localization based on time and amplitude differences between sounds captured by different microphones of the array. The device 102 (using microphone 816, wakeword detection component 801, ASR component 806, etc.) may be configured to generate audio data corresponding to captured audio. The device 102 (using input/output device interfaces 112, antenna 814, etc.) may also be configured to transmit the audio data to the remote system 106 for further processing or to process the data using internal components such as a wakeword detection component 801.

Via the antenna(s) 814, the input/output device interface 112 may connect to one or more networks 108 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Universal Serial Bus (USB) connections may also be supported. Power may be provided to the device 102 via wired connection to an external alternating current (AC) outlet, and/or via onboard power sources, such as batteries, solar panels, etc.

Through the network(s) 108, the speech-processing system may be distributed across a networked environment. Accordingly, the device 102 and/or the remote system 106 may include an ASR component 806. The ASR component 806 of device 102 may be of limited or extended capabilities. The ASR component 806 may include language models stored in ASR model storage component, and an ASR component 806 that performs automatic speech recognition. If limited speech recognition is included, the ASR component 806 may be configured to identify a limited number of words, such as keywords detected by the device, whereas extended speech recognition may be configured to recognize a much larger range of words.

The device 102 and/or the remote system 106 may include a limited or extended NLU component 808. The NLU component 808 of device 102 may be of limited or extended capabilities. The NLU component 808 may comprise a name entity recognition module, an intent classification module and/or other components. The NLU component 808 may also include a stored knowledge base and/or entity library, or those storages may be separately located.

In examples, acoustic event detection (AED) 804 may also be performed by the device 102. In these examples, the operations may include causing the AED component 804 to be enabled or otherwise turned on, or the operations may include causing the AED component 804 to transition from a first mode to a second mode representing a higher sensitivity to audio data generated by the microphone 816. The AED component 804 may utilize the audio data generated by the microphone 816 to determine if an audio fingerprint of the audio data, or portion thereof, corresponds to a reference audio fingerprint associated with the predefined event. For example, the one or more predefined events may be associated with one or more reference audio fingerprint characteristics of sound made when the event occurs. For example, the sound of a given person speaking may have a given audio fingerprint, the sound of a different person speaking may have another audio fingerprint, etc. The AED component 804 may receive an indication that audio has been captured and may utilize reference audio fingerprints for analysis in association with the audio fingerprint in question. It should be understood that while the term "audio fingerprint" is utilized herein, that term may include other terms such as "audio fingerprint" and/or "audio characteristics" and may correspond to characteristics of the audio data. For example, audio fingerprints may be generated utilizing a spectrogram that may split the audio data up over time and graphs frequency to amplitude over time. Peaks in frequency and/or amplitude may be identified in the spectrogram and may be utilized as characteristic points for comparison to reference audio fingerprints. The AED component 804 may determine that the audio fingerprint corresponds to at least one of the reference audio fingerprints, such as to a given confidence level, and may generate confirmatory data indicating that the audio fingerprint corresponds to the at least one reference audio fingerprint.

The device 102 and/or the remote system 106 may also include an application 810 that is configured to execute commands/functions associated with a spoken command as described herein. The device 102 may include a wake word engine 802, which may be a separate component or may be included in an ASR component 806. The wakeword detection component 801 receives audio signals and detects occurrences of a particular expression (such as a configured keyword) in the audio. This may include detecting a change in frequencies over a specific period of time where the change in frequencies results in a specific audio fingerprint that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 102 may be configured collectively to identify a set of the directional audio signals in which the wake expression is detected or in which the wake expression is likely to have occurred. In examples, the device 102 and may not include speaker(s) 818 and may utilize speaker(s) of an external or peripheral device to output audio via the speaker(s) of the external/peripheral device.

Figure 9A:
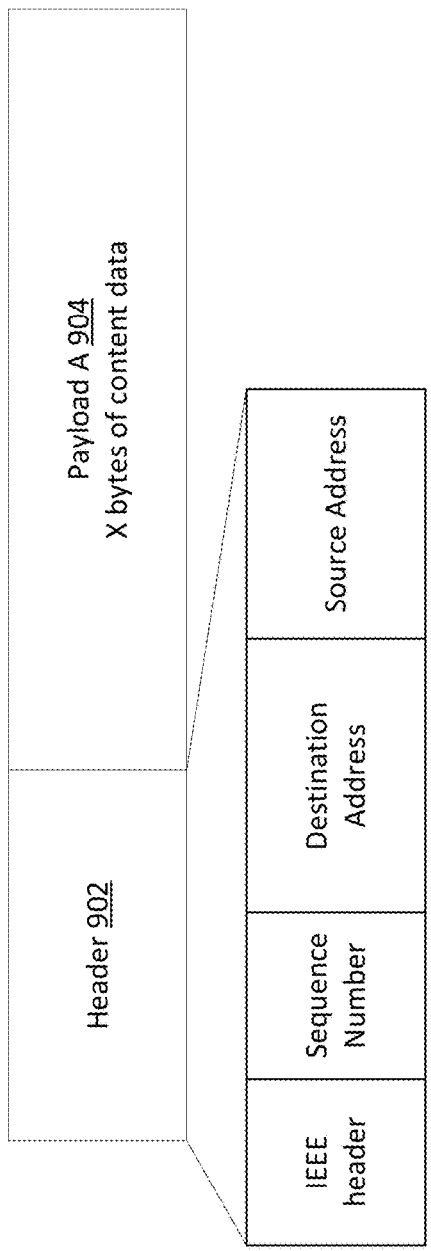
FIG. 9A illustrates an example data packet utilized in association with transmission unit size determinations.

FIG. 9A illustrates an example data packet that may be utilized for transmission of data between devices, such as the devices described herein.

A given data packet may include a header 902 and a payload 904. The header 902 may include control information and the payload 904 may include the content data to be transmitted between devices. The control information of the header 902 may include information such as a destination network address, a source network address, error detection codes, sequence numbers and/or other sequence information, protocol information associated with the protocol being utilized to transmit the data, etc. The payload 904 may include bytes of the content data to be sent from a sending device to a receiving device. The content data may have a given length, such as 1 megabytes, or otherwise 1,000,000 bytes. The transmission unit size of the data packets may be utilized to determine how to split up the content data between packets and how many packets are to be sent. For example, a given transmission unit size, such as a default transmission unit size as described herein, may be 1,000 bytes, which may define the size of the header 902 and payload 904 for a given data packet. In the example provided here, with a header 902 size of, for example, 10 bytes, 990 bytes of content data may be utilized per transmission unit in the 1,000 byte default transmission unit size. In this example, 1,011 data packets would be sent to transmit the megabyte of content data.

Figure 9B:
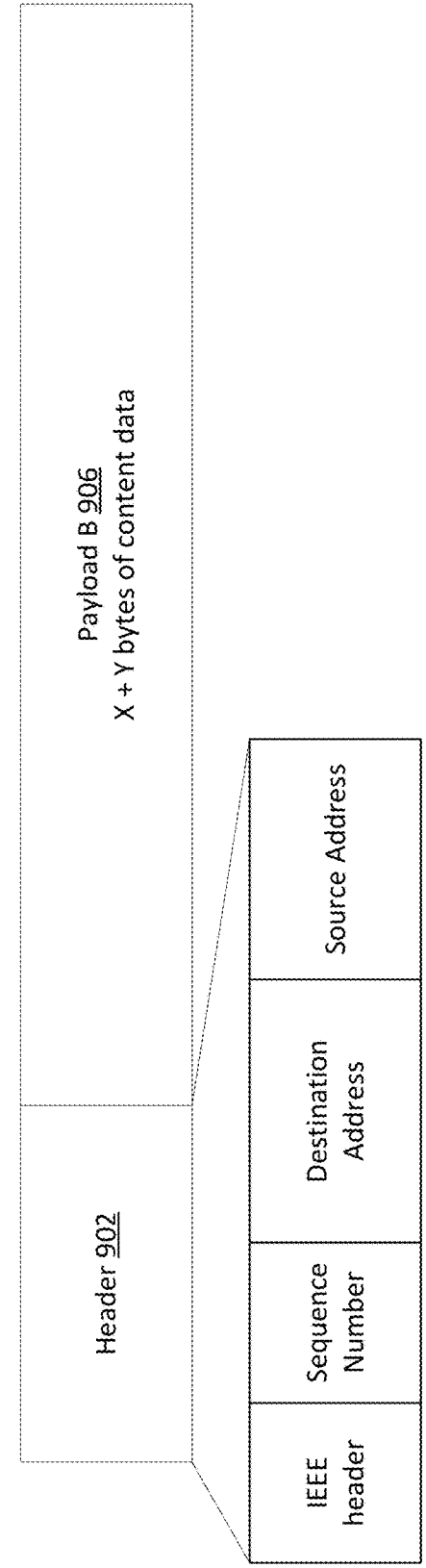
FIG. 9B illustrates another example data packet having a different transmission unit size from the data packet in FIG. 9A.

FIG. 9B illustrates another example data packet having a different transmission unit size from the data packet in FIG. 9A. The data packet may have a header 902 similar to the header 902 of FIG. 9A, and in examples the size of the header 902 may also be the same or similar. However, utilizing the processes described herein, it may be determined that the transmission unit size of data packets sent between devices is to be modified, such as to be larger or smaller than the default transmission unit size indicated in FIG. 9A.

For example, RSSI values may be utilized to determine that the transmission unit size of the data packets sent between devices should be increased to include more bytes than the default transmission unit size. As shown in FIG. 9B, while the number of bytes in the header 902 may remain the same, the payload 906 may differ from the payload 904 of the data packet in FIG. 9A in that the payload 906 may include more bytes than the payload 904 of FIG. 9A. By way of example, the transmission unit size may be increased to 1,500 bytes, such that the payload 906 of each packet may be 1,490 bytes in the example where the header 902 remains at 10 bytes. In this example, to transmit the 1 megabyte of content data, 672 packets may be sent between devices to transmit the content data. It should be understood that while this example indicates an increased transmission unit size, a decreased size with respect to a default size may be implemented.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims.

What is claimed is:

1. A device, comprising:
one or more processors; and
non-transitory computer-readable media storing computer-executable instructions that, when executed by the one or more processors, cause the one or more processors to perform operations comprising:
storing first data indicating a default transmission unit size for data transmission to a first device, the default transmission unit size determined from a configuration of the first device;
receiving, from the first device, second data indicating a first received signal strength indicator (RSSI) value associated with the data transmission with the first device;
determining that the first RSSI value satisfies a first threshold RSSI value indicating a strong communication signal between the first device and the device;
determining, in response to the first RSSI value satisfying the first threshold RSSI value, a first transmission unit size that is less than the default transmission unit size, the first transmission unit size associated with decreased latency of the data transmission as compared to the default transmission unit size;
receiving third data representing first content to be sent to the first device; and
sending the third data to the first device utilizing the first transmission unit size instead of the default transmission unit size.

2. The device of claim 1, the operations further comprising:
receiving, from the first device, fourth data indicating a second RSSI value associated with the data transmission with the first device;
determining that the second RSSI value satisfies a second threshold RSSI value indicating a weak communication signal between the first device and the device;
determining, in response to the second RSSI value satisfying the second threshold RSSI value, a second transmission unit size that is more than the default transmission unit size, the second transmission unit size associated with increased throughput of data packets in relation to the default transmission unit size;
receiving fifth data representing second content to be sent to the first device; and
sending the fifth data to the first device utilizing the second transmission unit size.

3. The device of claim 1, the operations further comprising:
- storing an indicator of the first transmission unit size for the data transmission between the first device and the device;
- determining that the first content is be sent to the first device;
- determining a data size associated with the first content;
- generating data packets for transmission to the first device, individual ones of the data packets including a header portion having a fixed number of bytes and a payload portion having a number of bytes of the first content, the number of bytes of the first content representing the first transmission unit size minus the fixed number of bytes of the header portion; and
- wherein sending the third data utilizing the first transmission unit size includes sending the data packets with the payload portion having the number of bytes.

4. The device of claim 1, the operations further comprising:
- determining, utilizing historical RSSI values received from the first device, a time period when RSSI values are expected to change between the first device and the device;
- determining a time to send a command requesting the first RSSI value utilizing the time period;
- sending the command at the time, wherein receiving the second data indicating the first RSSI value is in response to the command;
- determining a latency of data transmission associated with the historical RSSI values; and
- wherein determining the first transmission unit size includes selecting the first transmission unit size such that the latency is reduced.

5. A method, comprising:
- receiving first data indicating a first received signal strength indicator (RSSI) value associated with data transmission with a first device;
- determining that the first RSSI value satisfies a first threshold value indicating at least a predefined signal strength with the first device;
- determining, based at least in part on the first RSSI value satisfying the first threshold RSSI value, a first transmission unit size that is less than a default transmission unit size; and
- causing second data to be sent to the first device utilizing the first transmission unit size instead of the default transmission unit size.

6. The method of claim 5, wherein the first transmission unit size includes fewer bits of data than the default transmission unit size, and the method further comprises:
- receiving, from the first device, third data indicating a second RSSI value associated with the data transmission with the first device;
- determining that the second RSSI value satisfies a second threshold RSSI value;
- determining, based at least in part on the second RSSI value satisfying the second threshold RSSI value, a second transmission unit size that includes more bits of data than the default transmission unit size; and
- sending fourth data to the first device utilizing the second transmission unit size.

7. The method of claim 5, further comprising:
- determining that the second data corresponds at least in part to image data; and
- wherein determining the first transmission unit size comprises determining the first transmission unit size based at least in part on the second data corresponding at least in part to the image data.

8. The method of claim 5, further comprising:
- determining, based at least in part on historical RSSI values received from the first device, a time period when RSSI values are expected to change between the first device and a second device;
- determining when to send a command requesting the first RSSI value based at least in part on the time period;
- determining a latency of data transmission associated with the historical RSSI values; and
- wherein determining the first transmission unit size comprises determining the first transmission unit size based at least in part on the latency.

9. The method of claim 5, further comprising:
- determining that the second data has a file size that satisfies a threshold file size; and
- wherein determining the first transmission unit size comprises determining the first transmission unit size based at least in part on the file size satisfying the threshold file size.

10. The method of claim 5, further comprising:
- determining a performance metric associated with sending of the second data utilizing the first transmission unit size, the performance metric indicating at least one of a latency associated with sending the second data or a number of dropped packets associated with sending the second data; and
- determining a second transmission unit size to associate with the data transmission based at least in part on the performance metric.

11. The method of claim 5, further comprising:
- receiving third data indicating an operational mode of the first device, the operational mode associated with a battery level of the first device; and
- wherein determining the first transmission unit size comprises determining the first transmission unit size based at least in part on the third data.

12. The method of claim 5, further comprising determining a predefined amount of time that the first RSSI value satisfies the first threshold RSSI value based at least in part on historical data indicating historical RSSI values associated with the first device.

13. A device, comprising:
one or more processors; and
non-transitory computer-readable media storing computer-executable instructions that, when executed by the one or more processors, cause the one or more processors to perform operations comprising:
- receiving, from a computing device, first data indicating a first received signal strength indicator (RSSI) value associated with data transmission with the computing device;
- determining that the first RSSI value satisfies a first threshold RSSI value indicating at least a predefined signal strength with the computing device;
- determining, based at least in part on the first RSSI value satisfying the first threshold RSSI value, a first transmission unit size that is less than a default transmission unit size; and
- sending the second data to the computing device utilizing the first transmission unit size instead of the default transmission unit size.

14. The device of claim 13, wherein the first transmission unit size represents a smaller transmission unit size than the default transmission unit size, and the operations further comprise:
- receiving, from the computing device, third data indicating a second RSSI value associated with the data transmission with the computing device;
- determining that the second RSSI value satisfies a second threshold RSSI value;
- determining, based at least in part on the second RSSI value satisfying the second threshold RSSI value, a second transmission unit size that is more than the default transmission unit size; and
- sending fourth data to the computing device utilizing the second transmission unit size.

15. The device of claim 13, the operations further comprising:
- determining that the second data corresponds at least in part to image data;
- generating, based at least in part on determining that the second data corresponds at least in part to the image data, a command requesting the first RSSI value from the computing device;
- sending the command to the computing device; and
- wherein receiving the first data indicating the first RSSI value comprises receiving the first data in response to the command.

16. The device of claim 13, the operations further comprising:
- determining, based at least in part on historical RSSI values received from the first device, a time period when RSSI values are expected to change between the first device and the device; and
- determining when to send a command requesting the first RSSI value based at least in part on the time period.

17. The device of claim 13, the operations further comprising:
- determining that the second data has a file size that satisfies a threshold file size;
- generating, based at least in part on the file size satisfying the threshold file size, a command requesting the first RSSI value from the computing device;
- sending the command to the computing device; and
- wherein receiving the first data indicating the first RSSI value comprises receiving the first data in response to the command.

18. The device of claim 13, the operations further comprising:
- determining a performance metric associated with sending of the second data utilizing the first transmission unit size, the performance metric indicating at least one of a latency associated with sending the second data or a number of dropped packets associated with sending the second data; and
- determining a second transmission unit size to associate with the data transmission based at least in part on the performance metric.

19. The device of claim 13, the operations further comprising:
- receiving third data indicating RSSI values associated with the data transmission with the computing device over a period of time;
- determining that the RSSI values include the first RSSI value and a second RSSI value that differs from the first RSSI value;
- determining that the first RSSI value indicates less favorable data transmission than the second RSSI value; and
- selecting the first RSSI value to utilize for determining the first transmission unit size based at least in part on the first RSSI value indicating less favorable data transmission than the second RSSI value.

20. The system of claim 13, the operations further comprising determining the threshold amount of time that the first RSSI value satisfies the first threshold RSSI value based at least in part on historical data indicating historical RSSI values associated with the computing device.

* * * * *